(12) United States Patent
Takakura et al.

(10) Patent No.: US 12,447,165 B2
(45) Date of Patent: Oct. 21, 2025

(54) INTRATUMORAL VEIN-FORMATION PROMOTING AGENT

(71) Applicant: OSAKA UNIVERSITY, Osaka (JP)

(72) Inventors: Nobuyuki Takakura, Osaka (JP); Daisuke Eino, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 60 days.

(21) Appl. No.: 16/310,128

(22) PCT Filed: Jun. 15, 2017

(86) PCT No.: PCT/JP2017/022214
§ 371 (c)(1),
(2) Date: Dec. 14, 2018

(87) PCT Pub. No.: WO2017/217517
PCT Pub. Date: Dec. 21, 2017

(65) Prior Publication Data
US 2019/0328757 A1 Oct. 31, 2019

(30) Foreign Application Priority Data
Jun. 17, 2016 (JP) ................. 2016-121283

(51) Int. Cl.
| | | |
|---|---|---|
| A61K 31/685 | (2006.01) | |
| A61K 39/395 | (2006.01) | |
| A61K 40/10 | (2025.01) | |
| A61K 40/42 | (2025.01) | |
| A61P 43/00 | (2006.01) | |
| C07K 16/28 | (2006.01) | |

(52) U.S. Cl.
CPC ...... *A61K 31/685* (2013.01); *A61K 39/39541* (2013.01); *A61K 40/10* (2025.01); *A61K 40/42* (2025.01); *A61P 43/00* (2018.01); *C07K 16/2818* (2013.01); *A61K 2239/31* (2023.05); *A61K 2239/38* (2023.05); *A61K 2239/50* (2023.05); *A61K 2239/55* (2023.05); *A61K 2239/57* (2023.05); *C07K 16/2827* (2013.01)

(58) Field of Classification Search
CPC . A61K 31/685; A61K 39/39541; A61P 43/00; C07K 16/2818
See application file for complete search history.

(56) References Cited

U.S. PATENT DOCUMENTS

| | | | |
|---|---|---|---|
| 4,769,362 A | 9/1988 | Catsimpoolas et al. | |
| 6,677,319 B1 | 1/2004 | Stremmel | |
| 8,617,546 B2 * | 12/2013 | Kang | A61K 39/39558 424/130.1 |
| 2004/0043918 A1 | 3/2004 | Ueoka et al. | |
| 2006/0222696 A1 * | 10/2006 | Okada | A61P 43/00 514/19.3 |
| 2010/0292186 A1 | 11/2010 | Nakao et al. | |
| 2012/0237522 A1 * | 9/2012 | Kang | A61K 39/39558 424/130.1 |
| 2014/0120181 A1 | 5/2014 | Lee et al. | |
| 2017/0112861 A1 | 4/2017 | Takakura et al. | |
| 2017/0165364 A1 | 6/2017 | Ito et al. | |
| 2018/0264015 A1 | 9/2018 | Takakura et al. | |

FOREIGN PATENT DOCUMENTS

| | | |
|---|---|---|
| JP | 63-502341 | 9/1988 |
| JP | 5-201870 | 8/1993 |
| JP | 2000-290170 | 10/2000 |
| JP | 2007-210967 | 8/2007 |
| JP | 2014-517065 | 7/2014 |
| JP | WO2017/057643 | 8/2018 |
| WO | 02/28399 | 4/2002 |
| WO | 2012/049647 | 4/2012 |
| WO | 2015/092024 | 6/2015 |
| WO | 2015/092382 | 6/2015 |
| WO | 2015/125652 | 8/2015 |
| WO | 2015/152412 | 10/2015 |

(Continued)

OTHER PUBLICATIONS

The Merck Manuals Online Medical Library, [online]. Merck Research Laboratories, 2006-2007. [retrieved on Oct. 19, 2020]. < URL: https://www.merckmanuals.com/professional/hematology-and-oncology/overview-of-cancer/cellular-and-molecular-basis-of-cancer >. Cellular and Molecular Basis of Cancer (Year: 2007).*
Huang et al. "Tumor Vasculature and Microenvironment Normalization: A Possible Mechanism of Antiangiogenesis Therapy", Cancer Biother Radiopharm. Oct. 2008;23(5):661-7 (Year: 2008).*
Lohr et al. "Endothelial Cells Derived from Non-malignant Tissues Are of Limited Value as Models for Brain Tumor Vasculature", Anticancer Res. May 2015;35(5):2681-90. (Year: 2015).*
Metelitsa et al. "Natural Killer T Cells Infiltrate Neuroblastomas Expressing the Chemokine CCL2", J Exp Med. May 3, 2004;199(9):1213-21 (Year: 2004).*

(Continued)

*Primary Examiner* — Daniel E Kolker
*Assistant Examiner* — Peter Johansen
(74) *Attorney, Agent, or Firm* — Wenderoth, Lind & Ponack, L.L.P.

(57) ABSTRACT

Provided are agents comprising a phosphatidylcholine as an active ingredient to serve as a vein-formation promoting agent capable of promoting vein-like morphological change of tumor vessels, a vessel-diameter enlarging agent capable of enlarging the diameter of tumor vessels, a blood vessel-connection promoting agent capable of promoting connection of tumor vessels to each other without mediation of a lysophospholipid receptor, a leukocyte-infiltration promoting agent capable of promoting infiltration of leukocytes throughout a tumor region without mediation of a lysophospholipid receptor, and an antitumor immunostimulatory agent capable of promoting infiltration of leukocytes throughout a tumor region without mediation of a lysophospholipid receptor.

4 Claims, 11 Drawing Sheets

(56) References Cited

FOREIGN PATENT DOCUMENTS

WO 2015/176033 11/2015

OTHER PUBLICATIONS

Talmadge, JE. "Immune cell infiltration of primary and metastatic lesions: mechanisms and clinical impact", Semin Cancer Biol. Apr. 2011;21(2):131-8. (Year: 2011).*

Extended European Search Report issued Mar. 16, 2020 in corresponding European Patent Application No. 17813411.0.

Alino et al., "Antimetastatic Effect of Immunization With Liposome-Encapsulated Tumor Cell-Membrane Proteins Obtained From Experimental Tumors," Immunopharmacology and Immunotoxicology, 1995, vol. 17, No. 3, pp. 419-436.

Sengupta et al., "Liposome-Facilitated Enhancement of in Vitro Immunity To Human Colon Cancer," Immunological Investigations, 1985, vol. 14, No. 1, pp. 7-26.

International Preliminary Report on Patentability issued Mar. 1, 2018 in International Application No. PCT/JP2017/022214.

International Search Report issued Aug. 29, 2017 in International Application No. PCT/JP2017/022214.

WON T.J.et al, "Injection of phosphatidylcholine and deoxycholic acid regulates gene expression of lipolysis-related factors, pro-inflammatory cytokines, and hormones on mouse fat tissue", Food and Chemical Toxicology, 2013, vol. 60, pp. 263-268.

Provinciali M.et al, Effect of the silybin-phosphatidylcholine Complex (IdB 1016) on the Development of Mammary Tumors in HER-2/neu Transgenic Mice, Cancer Research, 2007, 67(5), pp. 2022-2029.

Sabnani M. K. et al, "Liposome promotion of tumor growth is associated with angiogenesis and inhibition of antitumor immune responses", Nanomedicine, 2015, vol. 11, issue 2, pp. 259-262.

Folkman J, et al, "Isolation of a Tumor Factor Responsible for Angiogenesis", J Exp Med 133, pp. 275-288, 1971.

Gerber HP et al, "Pharmacology and Pharmacodynamics of Bevacizumab as Monotherapy or in Combination with Cytotoxic Therapy in Preclinical Studies", Cancer Research, vol. 65, pp. 671-680, 2005.

Jain RK, "Normalization of tumor vasculature: An emerging concept in antiangiogenic therapy", Science, vol. 307, pp. 58-62, 2005.

Ebos JML et al, "Accelerated Metastasis after Short-Term Treatment with a Potent Inhibitor of Tumor Angiogenesis", Cancer Cell, vol. 15, pp. 232-239, 2009.

Paez-Ribes M et al, "Antiangiogenic Therapy Elicits Malignant Progression of Tumors to Increased Local Invasion and Distant Metastasis", Cancer Cell, vol. 12, pp. 220-231, 2009.

Kidoya H et al, "The apelin/APJ system induces maturation of the tumor vasculature and improves the efficiency of immune therapy", Oncogene 31: 3254-3264, 2012.

Maes H, et al., "Tumor Vessel Normalization by Chloroquine Independent of Autophagy", Cancer Cell, vol. 26, pp. 190-206, 2014.

Wong PP et al., "Dual-Action Combination Therapy Enhances Angiogenesis while Reducing Tumor Growth and Spread", Cancer cell, vol. 27, pp. 123-137, 2015.

* cited by examiner

INTRATUMORAL VEIN-FORMATION PROMOTING AGENT

TECHNICAL FIELD

The present disclosure relates to a vein-formation promoting agent, a vessel-diameter enlarging agent, a blood vessel-connection promoting agent, a leukocyte-infiltration promoting agent and an antitumor immunostimulatory agent each comprising a phosphatidylcholine as an active ingredient.

BACKGROUND ART

The formation of new blood vessels in normal tissue takes place via the process of vasculogenesis and a new circulation network is established. The process of vasculogenesis includes the steps of development of vascular endothelial cells, assembly of the endothelial cells into tubular structures (tubulogenesis), and vascular maturation by mural cell coverage of the endothelial cells. On the other hand, inflammation- or hypoxia-induced formation of new blood vessels from preexisting blood vessels takes place via the process of angiogenesis (sprouting blood vessel formation). The formation of new blood vessels in tumors also takes place via the process of angiogenesis. Such tumor neovascularization makes it possible to supply tumor cells with oxygen and nutrients. Therefore, antitumor therapies have been developed focusing on tumor angiogenesis inhibition to inhibit tumor growth.

In 1971, a tumor-secreted factor was found to induce the formation of new tumor vessels from preexisting blood vessels (Non Patent Literature 1). This angiogenic factor was identified as vascular endothelial growth factor (VEGF). VEGF plays a role in vascular endothelial cell growth and tubulogenesis by activating VEGF receptors (VEGFR1, 2, 3) expressed in vascular endothelial cells, in particular VEGFR2. The first developed anti-VEGF drug is an anti-VEGF neutralizing antibody, and this antibody has been clinically used early on as an angiogenesis inhibitor (Non Patent Literature 2). However, anti-VEGF neutralizing antibodies have been proven not to produce antitumor effect when used alone. Similarly, VEGF receptor tyrosine kinase inhibitors, which are a different type of angiogenesis inhibitor developed after anti-VEGF neutralizing antibodies, have been proven not to produce antitumor effect when used alone. On the other hand, a combined use of such an angiogenesis inhibitor and an anticancer drug has been clinically proven to produce a superior effect as compared with the use of the anticancer drug alone. Recent basic medical studies have indicated that the therapeutic effect of the combined use of an angiogenesis inhibitor and an anticancer drug is attributed to partial normalization of tumor vessels by the angiogenesis inhibitor and consequent improvement of intratumoral delivery of the anticancer drug (Non Patent Literature 3).

The lumina of normal blood vessels are structurally stabilized by adhesion of mural cells to vascular endothelial cells. Individual vascular endothelial cells tightly adhere to each other via various adhesion molecules, including VE-cadherin, claudin 5, integrins and connexins, and this structure contributes to the control of the passage of substances and cells from the blood vessels to prevent their massive leakage. Further, adherens junctions are formed between vascular endothelial cells and mural cells in normal blood vessels and serve to control vascular permeability by limited molecular transport between vascular endothelial cells and mural cells. Normal blood vessels on the right and left sides run parallel to one another. On the other hand, tumor vessels have various abnormalities. Specifically, intratumoral vessels are hyperpermeable, tortuos, dilated, irregularly branched and partially saccular. In addition, vascular endothelial cells of intratumoral vessels are also morphologically abnormal. Further, mural cells for covering vascular endothelial cells are highly interspersed and weakly adhere to vascular endothelial cells in the central region of a tumor, and such mural cell coverage is even absent in most part of the vessel. These abnormalities are mainly caused by over-secretion of VEGF in tumors.

VEGF is a potent growth factor for vascular endothelial cells and serves to inhibit cell-cell adhesion in vascular endothelial cells, thereby increasing vascular permeability. When such an increased vascular permeability continues, serum components and fibroblasts accumulate in the deep part of a tumor and then the interstitial pressure therein significantly increases. As a result, the intraluminal pressure in blood vessels becomes equal to the interstitial pressure in the deep part of the tumor, and this condition impedes the delivery of drugs and the like from blood vessels to the tumor tissue. Moreover, the influx of immune cells, such as lymphocytes, into the tumor is also inhibited. This makes it impossible to induce cancer cell death. Once the intracellular signaling of VEGF is blocked, cell-cell adhesion in vascular endothelial cells is restored, and increased vascular permeability returns to normal. As a result, the intraluminal pressure in blood vessels becomes higher than the interstitial pressure in the deep part of the tumor, thus providing an environment allowing anticancer drug delivery and immune cell influx from blood vessels to the tumor tissue. Therefore, a combined use of an angiogenesis inhibitor and an anticancer drug is considered to produce a superior effect as compared with the use of the anticancer drug alone. In addition, due to the improved influx of immune cells, cancer shrinkage may be achieved even without use of anticancer drugs.

Based on this hypothesis, the normalization of vascular permeability in tumors for induction of drug delivery into the tumors is now considered to be a potentially effective approach to cancer therapy. On the other hand, there is a concern that angiogenesis inhibitors inhibit survival of vascular endothelial cells and induce death of vascular endothelial cells and their interacting vascular mural cells, thereby aggravating ischemia in tumors. Hypoxia in tumors is considered to cause malignant transformation of cancer cells and facilitate cancer invasion and metastasis. Also reported is that angiogenesis inhibitors damage blood vessels in normal tissue and cause severe adverse effects, such as hypertension, lung hemorrhage and renal dysfunction (Non Patent Literature 4 and 5). Under such circumstances, there has been a demand for the development of a drug that normalizes the vascular permeability in tumors without causing the regression of tumor vessels and without affecting normal blood vessels.

The present inventors have found that lysophosphatidic acid (LPA) administered to subcutaneous tumor-bearing mice activates an LPA receptor, which mediates the induction of normal web-like network formation of tumor vessels, the formation of a smooth luminal surface in tumor vessels, and the normalization of vascular permeability. Based on this finding, the present inventors have applied for a patent (Patent Literature 1).

CITATION LIST

Patent Literature

Patent Literature 1: WO 2015/152412

Non Patent Literature

Non Patent Literature 1:
Folkman J, et al.: Isolation of a tumor factor responsible for angiogenesis. J Exp Med 133: 275-288, 1971
Non Patent Literature 2:
Gerber H P, Ferrara N. Pharmacology and pharmacodynamics of bevacizumab as monotherapy or in combination with cytotoxic therapy in preclinical studies. Cancer Res 65; 671-680, 2005
Non Patent Literature 3:
Jain RK: Normalization of tumor vasculature: An emerging concept in antiangiogenic therapy. Science 307: 58-62, 2005
Non Patent Literature 4:
Ebos JML et al., Accelerated metastasis after short-term treatment with a potent inhibitor of tumor angiogenesis. Cancer Cell 15: 232-239, 2009
Non Patent Literature 5:
Paez-Ribes M et al., Antiangiogenic therapy elicits malignant progression of tumors to increased local invasion and distant metastasis. Cancer Cell 12: 220-231, 2009

SUMMARY OF INVENTION

Technical Problem

An object of the present disclosure is to find out a substance which is capable of inducing intratumoral infiltration of immune cells by promoting connection of discontinuous intratumoral vessels to each other and promoting intratumoral vein formation without affecting normal blood vessels. Another object of the present disclosure is to provide a novel application of the substance.

Solution to Problem

The present disclosure includes the following to achieve the above-mentioned object.
(1) A vein-formation promoting agent comprising a phosphatidylcholine as an active ingredient, the agent being capable of promoting vein-like morphological change of tumor vessels.
(2) The vein-formation promoting agent according to the above (1), wherein the agent is capable of enlarging the diameter of tumor vessels and/or promoting connection of tumor vessels to each other.
(3) The vein-formation promoting agent according to the above (1) or (2), wherein the phosphatidylcholine is one kind of phosphatidylcholine or a mixture of two or more kinds of phosphatidylcholines.
(4) The vein-formation promoting agent according to any one of the above (1) to (3), wherein the agent is used in combination with cancer immunotherapy.
(5) The vein-formation promoting agent according to the above (4), wherein the cancer immunotherapy is a therapy for reversal of immunosuppression and/or immune cell infusion therapy.
(6) The vein-formation promoting agent according to the above (5), wherein the therapy for reversal of immunosuppression uses an immune checkpoint inhibitor, and wherein the immune checkpoint inhibitor is an anti-CTLA-4 antibody, a PD-1 blocker, an anti-PD-1 antibody, a PD-L1 blocker or an anti-PD-L1 antibody.
(7) A vessel-diameter enlarging agent comprising a phosphatidylcholine as an active ingredient, the agent being capable of enlarging the diameter of tumor vessels.
(7-2) The vessel-diameter enlarging agent according to the above (7), wherein the phosphatidylcholine is one kind of phosphatidylcholine or a mixture of two or more kinds of phosphatidylcholines.
(7-3) The vessel-diameter enlarging agent according to the above (7) or (7-2), wherein the agent is used in combination with cancer immunotherapy.
(7-4) The vessel-diameter enlarging agent according to the above (7-3), wherein the cancer immunotherapy is a therapy for reversal of immunosuppression and/or immune cell infusion therapy.
(7-5) The vessel-diameter enlarging agent according to the above (7-4), wherein the therapy for reversal of immunosuppression uses an immune checkpoint inhibitor, and wherein the immune checkpoint inhibitor is an anti-CTLA-4 antibody, a PD-1 blocker, an anti-PD-1 antibody, a PD-L1 blocker or an anti-PD-L1 antibody.
(8) A blood vessel-connection promoting agent comprising a phosphatidylcholine as an active ingredient, the agent being capable of promoting connection of tumor vessels to each other without mediation of a lysophospholipid receptor.
(8-2) The blood vessel-connection promoting agent according to the above (8), wherein the phosphatidylcholine is one kind of phosphatidylcholine or a mixture of two or more kinds of phosphatidylcholines.
(8-3) The blood vessel-connection promoting agent according to the above (8) or (8-2), wherein the agent is used in combination with cancer immunotherapy.
(8-4) The blood vessel-connection promoting agent according to the above (8-3), wherein the cancer immunotherapy is a therapy for reversal of immunosuppression and/or immune cell infusion therapy.
(8-5) The blood vessel-connection promoting agent according to the above (8-4), wherein the therapy for reversal of immunosuppression uses an immune checkpoint inhibitor, and wherein the immune checkpoint inhibitor is an anti-CTLA-4 antibody, a PD-1 blocker, an anti-PD-1 antibody, a PD-L1 blocker or an anti-PD-L1 antibody.
(9) A leukocyte-infiltration promoting agent comprising a phosphatidylcholine as an active ingredient, the agent being capable of promoting infiltration of leukocytes throughout a tumor region without mediation of a lysophospholipid receptor.
(9-2) The leukocyte-infiltration promoting agent according to the above (9), wherein the phosphatidylcholine is one kind of phosphatidylcholine or a mixture of two or more kinds of phosphatidylcholines.
(9-3) The leukocyte-infiltration promoting agent according to the above (9) or (9-2), wherein the agent is used in combination with cancer immunotherapy.
(9-4) The leukocyte-infiltration promoting agent according to the above (9-3), wherein the cancer immunotherapy is a therapy for reversal of immunosuppression and/or immune cell infusion therapy.
(9-5) The leukocyte-infiltration promoting agent according to the above (9-4), wherein the therapy for reversal of immunosuppression uses an immune checkpoint inhibitor, and wherein the immune checkpoint inhibitor is an anti-CTLA-4 antibody, a PD-1 blocker, an anti-PD-1 antibody, a PD-L1 blocker or an anti-PD-L1 antibody.

(10) The leukocyte-infiltration promoting agent according to the above (9), wherein the leukocytes are CD4-positive cells and/or CD8-positive cells.

(11) An antitumor immunostimulatory agent comprising a phosphatidylcholine as an active ingredient, the agent being capable of promoting infiltration of leukocytes throughout a tumor region without mediation of a lysophospholipid receptor.

(11-2) The leukocyte-infiltration promoting agent according to the above (11), wherein the phosphatidylcholine is one kind of phosphatidylcholine or a mixture of two or more kinds of phosphatidylcholines.

(11-3) The leukocyte-infiltration promoting agent according to the above (11) or (11-2), wherein the agent is used in combination with cancer immunotherapy.

(11-4) The leukocyte-infiltration promoting agent according to the above (11-3), wherein the cancer immunotherapy is a therapy for reversal of immunosuppression and/or immune cell infusion therapy.

(11-5) The leukocyte-infiltration promoting agent according to the above (11-4), wherein the therapy for reversal of immunosuppression uses an immune checkpoint inhibitor, and wherein the immune checkpoint inhibitor is an anti-CTLA-4 antibody, a PD-1 blocker, an anti-PD-1 antibody, a PD-L1 blocker or an anti-PD-L1 antibody.

(12) The antitumor immunostimulatory agent according to the above (11), wherein the leukocytes are CD4-positive cells and/or CD8-positive cells.

Advantageous Effects of Invention

Phosphatidylcholine, which is an active ingredient of the present disclosure, is capable of promoting connection of abnormally discontinuous intratumoral vessels to each other and enlarging the diameter of tumor vessels to promote vein formation without affecting normal blood vessels. It is known that inflammatory cells, such as leukocytes, enter tissues from veins, not from capillaries. Taken these together, phosphatidylcholine has the potential to improve intratumoral blood flow, promote leukocyte infiltration throughout the tumor region, stimulate antitumor immunity in the tumor, and/or inhibit tumor growth. The vein-formation promoting agent, the vessel-diameter enlarging agent, the blood vessel-connection promoting agent, the leukocyte-infiltration promoting agent and the antitumor immunostimulatory agent of the present disclosure do not destroy tumor vessels but rather diminish the hypoxic area in a tumor. For this reason, these agents have the advantage of not inducing malignant transformation of cancer cells. Moreover, the vein-formation promoting agent, the vessel-diameter enlarging agent, the blood vessel-connection promoting agent, the leukocyte-infiltration promoting agent and/or the antitumor immunostimulatory agent of the present disclosure have the advantage of efficiently delivering a drug used in combination with these agents into a tumor.

DESCRIPTION OF EMBODIMENTS

Figure 1:
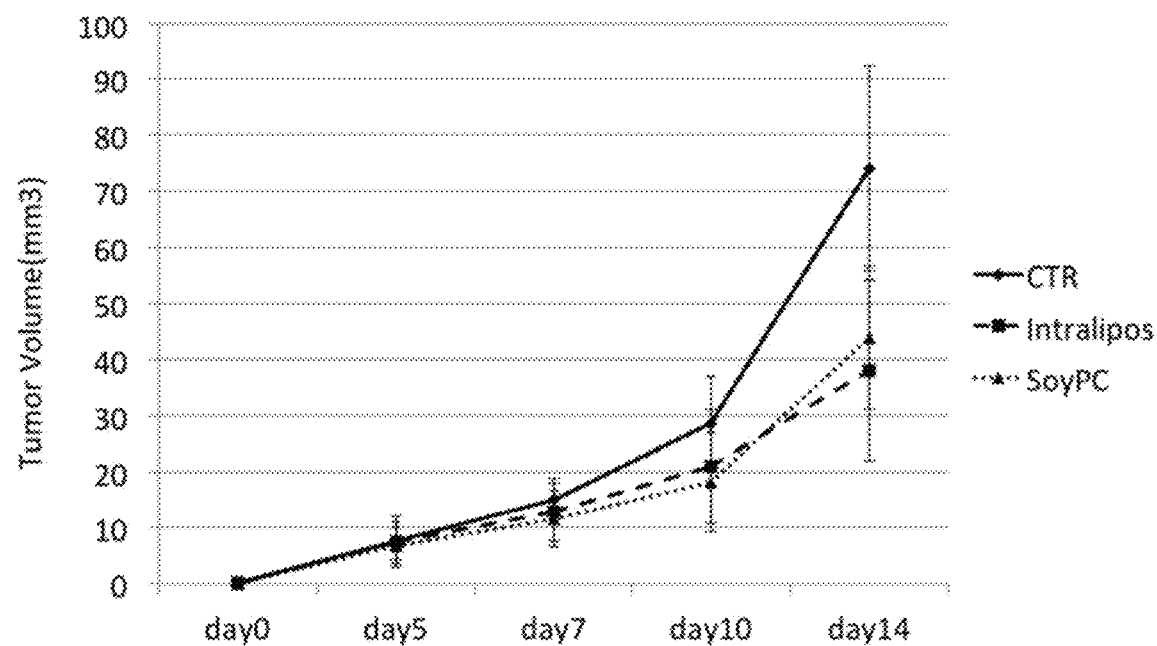
FIG. 1 shows the tumor growth inhibitory effect of soybean phosphatidylcholine or Intralipos Injection 20% (trade name, Otsuka Pharmaceutical Co., Ltd., containing 1.2 mg of purified yolk lecithin in 100 μL) administered for 9 days to tumor-bearing mice generated by subcutaneous inoculation of a mouse Lewis lung cancer cell line (hereinafter referred to as "LLC cells").

Phosphatidylcholine is a member of phospholipid and is also called lecithin. Phospholipids, unlike other lipids, not only serve as an energy source, but also participate in cellular signal transduction as a lipid mediator. Phosphatidylcholine is the most abundant among phospholipids in a human body and is a major component of cell membranes. Phosphatidylcholine is also known as a source of the neurotransmitter acetylcholine and is considered to be associated with transmission of parasympathetic impulses and learning, memory and sleep. In addition, phosphatidylcholine is also known to participate in lipid metabolism and have hepatoprotective activity. Phosphatidylcholine is physically characterized by having the features of both water and oil. Phosphatidylcholine is composed of four constituents: phosphoric acid, choline, glycerol and fatty acids. Since phosphoric acid and choline are hydrophilic and glycerol and fatty acids are lipophilic, phosphatidylcholine has emulsifying effect, which makes water and oil into a smooth mixture. Due to this emulsifying effect, phosphatidylcholine helps intracellular water-soluble substances and intracellular lipophilic substances to mix with each other, and thereby contributes to intracellular absorption of nutrients, excretion of cellular waste products and other cellular events. In addition, the emulsifying effect leads to activation of lipid metabolism, through which phosphatidylcholine is considered effective for improvement of hyperlipidemia and for prevention of arteriosclerosis. However, specific effects of phosphatidylcholine on intratumoral vessels have not been understood at all.

The present inventors administered phosphatidylcholine to tumor-bearing mice generated by subcutaneous inoculation of cancer cells. As a result, tumor growth was inhibited as compared with mice which had not received phosphatidylcholine (non-treatment mice). In addition, tumor vessels in the non-treatment mice were tortuous and irregularly branched, but in the mice having received phosphatidylcholine, tumor vessels were no longer discontinuous and were connected to each other to form a web-like network as observed in normal tissue, and some of the tumor vessels had a vein-like morphology with an enlarged diameter. Further, the examination of immune cell localization in the tumor of the mice having received phosphatidylcholine revealed that a larger number of CD4-positive cells and CD8-positive cells were present throughout the tumor region including the central region of the tumor as compared with tumor tissue of the non-treatment mice. That is, the present inventors found that phosphatidylcholine is capable of promoting infiltration of immune cells throughout the tumor region. The above results show that phosphatidylcholine administration promotes infiltration of CD8-positive cytotoxic T cells and CD4-positive helper T cells into a tumor, resulting in stimulation of antitumor immunity and activation of cytotoxic T-cell attack on tumor cells, leading to the induction of antitumor effect.

The present inventors previously found that lysophosphatidic acid (LPA) administered to subcutaneous tumor-bearing mice activates an LPA receptor, which mediates the induction of normal web-like network formation of tumor vessels, the formation of a smooth luminal surface in tumor vessels, and the normalization of vascular permeability (Patent Literature 1). Lysophosphatidic acid is enzymatically synthesized from lysophosphatidylcholine, which is produced by enzymatic decomposition of phosphatidylcholine. Considering this, there was a possibility that the newly discovered effects of phosphatidylcholine might be underlain by the mechanism that the administered phosphatidylcholine undergoes in vivo decomposition into lysophosphatidic acid, which activates a lysophosphatidic acid receptor and thereby produces the effects. However, the structural improvement of intratumoral vessels and the promotion of immune cell infiltration after phosphatidylcholine administration were not observed after lysophosphatidyicholine administration (see Reference Example 1). Furthermore, in an experiment using lysophosphatidic acid receptor 4-deficient mice, phosphatidylcholine administration improved the structure of intratumoral vessels and promoted immune cell infiltration. Therefore, the effects of phosphatidylcholine were proven not to be mediated by a lysophosphatidic acid receptor.

In addition, Patent Literature 1 discloses that administration of a lysophospholipid receptor-activating substance is effective for inducing tumor vessels, which have been tortuous and irregularly branched before administration, to form a web-like network as observed in normal tissue and for normalizing vascular permeability. However, there is no description or suggestion on dilation or vein-like morphological change of the connected tumor vessels or on immune cell infiltration throughout the tumor region. That is, even with the knowledge that phosphatidylcholine is a precursor of lysophosphatidic acid, the above-mentioned effects of phosphatidylcholine administration cannot be anticipated from the disclosure of Patent Literature 1.

The present disclosure provides a vein-formation promoting agent which comprises a phosphatidylcholine as an active ingredient and is capable of promoting vein-like morphological change of tumor vessels. The present disclosure also provides a vessel-diameter enlarging agent which comprises a phosphatidylcholine as an active ingredient and is capable of enlarging the diameter of tumor vessels. The present disclosure also provides a blood vessel-connection promoting agent which comprises a phosphatidylcholine as an active ingredient and is capable of promoting connection of tumor vessels to each other without mediation of a lysophospholipid receptor. The present disclosure also provides a leukocyte-infiltration promoting agent and an antitumor immunostimulatory agent, each of which comprises a phosphatidylcholine as an active ingredient and is capable of promoting infiltration of leukocytes throughout a tumor region without mediation of a lysophospholipid receptor. Hereinafter, these embodiments of the present disclosure are collectively referred to as "the agent of the present disclosure." The phosphatidylcholine used as an active ingredient of the agent of the present disclosure does not encompass a phosphatidylcholine which is a component of another agent to be administered in the form of liposomes or colloidal particles encapsulating or incorporating another therapeutic drug.

The phosphatidylcholine (also called lecithin) used as an active ingredient of the agent of the present disclosure is not particularly limited as long as its structure has ester bonds with fatty acids at the C-1 and C-2 positions of glycerol and an ester bond with phosphocholine at the C-3 position of glycerol. Examples of the phosphatidylcholine include yolk lecithin, soybean lecithin, soybean phosphatidylcholine, dioctanoyl phosphatidylcholine, dinonanoyl phosphatidylcholine, didecanoyl phosphatidylcholine, diundecanoyl phosphatidylcholine, dilauroyl phosphatidylcholine, dimyristoyl phosphatidylcholine, dipalmitoyl phosphatidylcholine, distearoyl phosphatidylcholine, dipalmitoleoyl phosphatidylcholine, dioleoyl phosphatidylcholine, dilinoleoyl phosphatidylcholine, dieicosapentaenoyl phosphatidylcholine, didocosahexaenoyl phosphatidylcholine, dierucoyl phosphatidylcholine, (1-myristoyl-2-palmitoyl) phosphatidylcholine, (1-palmitoyl-2-myristoyl) phosphatidylcholine, (1-oleoyl-2-palmitoyl) phosphatidylcholine and (1-palmitoyl-2-oleoyl) phosphatidylcholine.

The phosphatidylcholine used in the agent of the present disclosure may be a phosphatidylcholine extracted from the natural source or a phosphatidylcholine chemically synthesized. Examples of the phosphatidylcholine extracted from the natural source include yolk lecithin, soybean lecithin and soybean phosphatidylcholine. Purified yolk lecithin and purified soybean lecithin of high quality and high purity are commercially available, and such commercial products are suitable for use in the present disclosure. The phosphatidylcholine used in the present disclosure may contain two or more kinds of phosphatidylcholines or be composed of one kind of phosphatidylcholine. The phosphatidylcholine extracted from the natural source is usually a mixture of several kinds of phosphatidylcholines.

Each fatty acid group of the phosphatidylcholine may be a saturated fatty acid group or an unsaturated fatty acid group. The number of carbon atoms of the fatty acid group is not particularly limited, and may be 2 or more, 4 or more, 6 or more, 8 or more, 10 or more, 15 or more, 20 or more, or 30 or more. In addition, the number of carbon atoms of the fatty acid group may be 100 or less, 80 or less, 60 or less, 50 or less, 40 or less, or 30 or less. The number of double bonds of the unsaturated fatty acid group is not particularly limited, and may be 1 or more, 2 or more, 3 or more, 4 or more, or 5 or more. In addition, the number of double bonds of the unsaturated fatty acid group may be 6 or less, 5 or less, 4 or less, 3 or less, or 2 or less. The two fatty acid groups of the phosphatidylcholine may be the same or different from each other. That is, the two fatty acid groups of the phosphatidylcholine may be identical saturated fatty acid groups, identical unsaturated fatty acid groups, different saturated fatty acid groups, different unsaturated fatty acid groups, or a combination of a saturated fatty acid group and an unsaturated fatty acid group.

In the present disclosure, a tumor is a mass of abnormally growing cells and includes a benign tumor and a malignant tumor. The tumor as a target of the agent of the present disclosure for promoting vein-like morphological change of blood vessels and leukocyte infiltration may be a benign tumor or a malignant tumor, and is preferably a malignant tumor. More preferably, the tumor is a solid cancer. In solid cancers, blood vessels are tortuous and irregularly branched, the luminal surface is irregular, and vascular permeability is excessively increased. Solid cancers include, but are not limited to, lung cancer, colon cancer, prostate cancer, breast cancer, pancreatic cancer, esophageal cancer, gastric cancer, liver cancer, biliary cancer, spleen cancer, renal cancer, bladder cancer, uterine cancer, ovarian cancer, testicular cancer, thyroid cancer and brain tumor. Solid cancers also include a tumor formed from cancerous blood cells.

In the present disclosure, the vein-like morphological change of tumor vessels can be confirmed by, for example, preparing tissue specimens of a tumor, immunostaining the tissue specimens with an antibody specific to vascular endothelial cells, and measuring the vessel diameter. Specifically, in the case where the vessel diameter is more than 10 µm, the vessel can be judged to have changed into a vein-like form. Preferably, the vessel diameter is 12 µm or more, and is more preferably 15 µm or more. In addition, the vein-like morphological change of tumor vessels can also be confirmed by examining the expression of a gene specific to venous cells. Examples of the gene specific to venous cells include EphB4 and COUP-TFII. The gene expression can be examined by known methods, such as PCR, using the nucleic acid extracted from a sample. The vein-like morphological change of tumor vessels may be confirmed based on a combination of the vessel diameter and the gene expression specific to venous cells. Specifically, for example, in the case where the vessel diameter of more than 10 µm and the expression of EphB4 and COUP-TFII in blood vessel tissue have been confirmed, the tumor vessel can be judged to have changed into a vein-like form.

In the present disclosure, leukocytes include lymphocytes (T cells, B cells and NK cells), monocytes (macrophages and dendritic cells) and granulocytes (neutrophils, eosinophils and basophils). The type of leukocytes whose infiltration throughout a tumor region is promoted by the agent of the present disclosure is not particularly limited, and the agent of the present disclosure promotes the infiltration of all types of cells included in the leukocytes as described above. Preferably, the leukocytes are cells serving to stimulate antitumor immunity in tumors (antitumor immune cells). Examples of such cells include cytotoxic T cells, NK cells, NKT cells, killer cells, macrophages, granulocytes, helper T cells and LAK cells. The leukocytes whose infiltration into the central region of a tumor is promoted by the agent of the present disclosure are preferably CD4-positive cells and/or CD8-positive cells. The CD4-positive cells are preferably helper T cells, and the CD8-positive cells are preferably cytotoxic T cells. The type and location of cells that have infiltrated into a tumor can be identified by, for example, preparing tissue specimens of the tumor and immunostaining the tissue specimens with an antibody against a surface antigen specific to the cells of interest.

In some embodiments, the agent of the present disclosure may be in the form of a medicament. That is, the agent of the present disclosure can be produced in a dosage form by blending phosphatidylcholine as an active ingredient with a pharmaceutically acceptable carrier or additive as appropriate according to a known production method for pharmaceutical preparations (e.g., the methods described in the Japanese Pharmacopoeia, etc.). Specifically, the agent of the present disclosure may be, for example, an oral preparation or a parenteral preparation, including tablets (including sugar-coated tablets, film-coated tablets, sublingual tablets, orally disintegrating tablets, and buccal tablets), pills, powders, granules, capsules (including soft capsules and microcapsules), troches, syrups, liquids, emulsions, suspensions, controlled-release preparations (e.g., fast-release preparations, sustained release preparations, sustained release microcapsules, etc.), aerosols, films (e.g., orally disintegrating films, oral mucosal adhesive films, etc.), injections (e.g., subcutaneous injections, intravenous injections, intramuscular injections, intraperitoneal injections, etc.), intravenous infusions, transdermal preparations, ointments, lotions, patches, suppositories (e.g., rectal suppositories, vaginal suppositories, etc.), pellets, transnasal preparations, transpulmonary preparations (inhalants), and eye drops. The amount of the carrier or the additive to be added is determined as appropriate based on the range of amount conventionally used in the pharmaceutical field. The carrier or the additive that can be used is not particularly limited, and examples include various carriers such as water, physiological saline, other aqueous solvents, and aqueous or oily bases; and various additives such as fillers, binders, pH adjusters, disintegrants, absorption enhancers, lubricants, colorants, corrigents and fragrances.

Examples of the additive that can be blended into tablets, capsules and the like include binders such as gelatin, cornstarch, tragacanth and gum arabic; fillers such as crystalline cellulose; bulking agents such as cornstarch, gelatin and alginic acid; lubricants such as magnesium stearate; sweeteners such as sucrose, lactose and saccharin; and flavors such as peppermint, *Gaultheria adenothrix* oil and cherry. In the case where the unit dosage form is a capsule, a liquid carrier such as fats and oils can be further contained in addition to the above-mentioned ingredients. A sterile composition for injection can be prepared according to the usual procedure for pharmaceutical formulation, for example, by dissolving or suspending an active ingredient in a solvent such as water for injection and a natural vegetable oil. As an aqueous liquid for injection, for example, physiological saline, an isotonic solution containing glucose and an auxiliary substance (e.g., D-sorbitol, D-mannitol, sodium chloride, etc.), or the like can be used, optionally together with a suitable solubilizer such as alcohols (e.g., ethanol etc.), polyalcohols (e.g., propylene glycol, polyethylene glycol, etc.) and nonionic surfactants (e.g., polysorbate 80™, HCO-50, etc.). As an oily liquid, for example, sesame oil, soybean oil or the like can be used, optionally together with a solubilizer such as benzyl benzoate and benzyl alcohol. Further, a buffering agent (e.g., phosphate buffer, sodium acetate buffer, etc.), a soothing agent (e.g., benzalkonium chloride, procaine hydrochloride, etc.), a stabilizer (e.g., human serum albumin, polyethylene glycol, etc.), a preservative (e.g., benzyl alcohol, phenol, etc.), an antioxidant and/or the like may also be added.

In some embodiments, the agent of the present disclosure may be in the form of a lipid emulsion containing phosphatidylcholine in a vegetable oil. Examples of the vegetable oil include soybean oil, corn oil, coconut oil, safflower oil, perilla oil, olive oil, castor oil and cottonseed oil. Preferred is soybean oil. For example, "Intralipos Injection 10% (trade name)" and "Intralipos Injection 20% (trade name)" (both are manufactured by Otsuka Pharmaceutical Co., Ltd.), which are listed in the National Health Insurance (NHI) Drug Price List as pharmaceutical products for nutritional support in the pre- or post-operative or other appropriate periods, contain purified soybean oil as an active ingredient and purified yolk lecithin (1.2 g/100 mL) as an additive. Therefore, "Intralipos Injection 10% (trade name)" and "Intralipos Injection 20% (trade name)" are suitable for embodiments of the agent of the present disclosure.

Phosphatidylcholine is a substance present in a living body and has been practically used as an active ingredient or an additive in pharmaceutical products for administration to humans. Therefore, phosphatidylcholine is less toxic and safely administrable to humans and other mammals (e.g., rats, mice, rabbits, sheep, pigs, cattle, cats, dogs, monkeys, etc.).

The amount of an active ingredient contained in pharmaceutical preparations is determined as appropriate for the dosage form, the administration method, the carrier and the like. The amount of phosphatidylcholine can be usually 0.01 to 100% (w/w), preferably 0.1 to 95% (w/w) relative to the total weight of the pharmaceutical preparation.

The dose of phosphatidylcholine may vary depending on the subject, the symptoms, the administration route and the like, but in general, the daily oral dose for a human weighing about 60 kg is, for example, about 0.01 to 1000 mg, preferably about 0.1 to 100 mg, and more preferably about 0.5 to 500 mg. The single dose for parenteral administration may also vary depending on patient's condition, the symptoms, the administration method and the like, but for example in the case of injection preparations, the single intravenous dose is usually, for example, about 0.01 to 100 mg, preferably about 0.01 to 50 mg, and more preferably about 0.01 to 20 mg per kg of body weight. The total daily dose may be given as a single dose or in divided doses.

The agent of the present disclosure may be used in combination with cancer immunotherapy. The agent of the present disclosure, when used in combination with cancer immunotherapy, can stimulate antitumor immunity and increase tumor cytotoxicity. The phrase "the agent of the present disclosure is used in combination with cancer immunotherapy" means that the agent of the present disclosure is used for administration to a cancer patient receiving cancer immunotherapy or that the agent of the present disclosure is used in combination (concomitantly) with a drug for cancer immunotherapy. When the agent of the present disclosure is used in combination with cancer immunotherapy, the dose of the drug for cancer immunotherapy can be reduced, which may lead to reduced side effects. Moreover, the reduction in the dose of the drug for cancer immunotherapy meets social needs including healthcare cost reduction. As used herein, the terms "used in combination" and "used concomitantly" have the same meaning.

Examples of the cancer immunotherapy include cancer vaccine therapy, immune cell infusion therapy, a therapy for reversal of immunosuppression and a therapy for inducing the depletion of regulatory T cells. In some embodiments, the cancer immunotherapy may be a therapy for reversal of immunosuppression or immune cell infusion therapy. The immune checkpoint inhibitor used in the therapy for reversal of immunosuppression is, for example, an anti-CTLA-4 antibody, a PD-1 blocker, an anti-PD-1 antibody, a PD-L1 blocker, an anti-PD-L1 antibody, or the like. Examples of the immune cell infusion therapy include chimeric antigen receptor-modified T-cell therapy. In the case where the agent of the present disclosure is administered after depletion of regulatory T cells, the same effect as produced by a combined use of the agent of the present disclosure and an immune checkpoint inhibitor is expected. This is because regulatory T cells play a role in immunological tolerance. Examples of the drug that induces the depletion of regulatory T cells include alkylating agents, an IL-2-diphtheria toxin fusion protein, an anti-CD25 antibody, an anti-KIR antibody, an IDO inhibitor and a BRAF inhibitor.

Examples of the drug for cancer immunotherapy include Picibanil, Krestin, sizofiran, lentinan, ubenimex, interferons, interleukins, macrophage colony-stimulating factor, granulocyte colony-stimulating factor, erythropoietin, lymphotoxins, BCG vaccine, *Corynebacterium parvum*, levamisole, polysaccharide K, procodazole, ipilimumab, nivolumab, ramucirumab, ofatumumab, panitumumab, pembrolizumab, obinutuzumab, trastuzumab emtansine, tocilizumab, bevacizumab, trastuzumab, siltuximab, cetuximab, infliximab, rituximab, metformin and aflibercept.

When the agent of the present disclosure is used in combination with cancer vaccine, efficient infiltration of cancer vaccine-stimulated T cells into a tumor can be achieved. In addition, the agent of the present disclosure can enhance the efficacy of immune cell infusion therapy, which uses immune cells such as T cells from a patient or a non-patient.

Since the combined use of the agent of the present disclosure and cancer immunotherapy can enhance cancer immunotherapy and increase tumor cytotoxicity as described above, the agent of the present disclosure according to an embodiment where the agent is used in combination with cancer immunotherapy can be called a cancer immunotherapy-enhancing agent.

The agent of the present disclosure can be used in combination with an anticancer drug other than those described above. Due to the antitumor immunostimulatory effect of the agent of the present disclosure, the original anticancer effect of the anticancer drug can be enhanced. Thus, the dose of the anticancer drug can be reduced, which may lead to reduced side effects. Moreover, the reduction in the dose of the anticancer drug meets social needs including healthcare cost reduction.

The anticancer drug is not particularly limited and is preferably, for example, a chemotherapeutic drug, an immunotherapeutic drug or a hormone therapy drug. These anticancer drugs may be in the form of a liposomal formulation. These anticancer drugs may be in the form of a nucleic acid formulation or an antibody formulation.

The chemotherapeutic drug is not particularly limited and examples include alkylating agents such as nitrogen mustard, nitrogen mustard N-oxide hydrochloride, chlorambucil, cyclophosphamide, ifosfamide, thiotepa, carboquone, improsulfan tosilate, busulfan, nimustine hydrochloride, mitobronitol, melphalan, dacarbazine, ranimustine, estramustine phosphate sodium, triethylenemelamine, carmustine, lomustine, streptozocin, pipobroman, ethoglucid, carboplatin, cisplatin, miboplatin, nedaplatin, oxaliplatin, altretamine, ambamustine, dibrospidium chloride, fotemustine, prednimustine, pumitepa, Ribomustin, temozolomide, treosulfan, trofosfamide, zinostatin stimalamer, adozelesin, cystemustine and bizelesin; antimetabolites such as mercaptopurine, 6-mercaptopurine riboside, thioinosine, methotrexate, pemetrexed, enocitabine, cytarabine, cytarabine ocfosfate, ancitabine hydrochloride, 5-FU and its derivatives (e.g., fluorouracil, tegafur, UFT, doxifluridine, carmofur, galocitabine, emitefur, capecitabine, etc.), aminopterin, nelzarabine, leucovorin calcium, Tabloid, butocin, calcium folinate, calcium levofolinate, cladribine, emitefur, fludarabine, gemcitabine, hydroxycarbamide, pentostatin, piritrexim, idoxuridine, mitoguazone, tiazofurin, ambamustine and bendamustine; anticancer antibiotics such as actinomycin D, actinomycin C, mitomycin C, chromomycin A3, bleomycin hydrochloride, bleomycin sulfate, peplomycin sulfate, daunorubicin hydrochloride, doxorubicin hydrochloride, aclarubicin hydrochloride, pirarubicin hydrochloride, epirubicin hydrochloride, neocarzinostatin, mithramycin, sarkomycin, carzinophilin, mitotane, zorubicin hydrochloride, mitoxantrone hydrochloride and idarubicin hydrochloride; and plant-derived anticancer drugs such as etoposide, etoposide phosphate, vinblastine sulfate, vincristine sulfate, vindesine sulfate, teniposide, paclitaxel, docetaxel, vinorelbine, irinotecan, and irinotecan hydrochloride.

The immunotherapeutic drug is not particularly limited and examples include Picibanil, Krestin, sizofiran, lentinan, ubenimex, interferons, intexleukins, macrophage colony-stimulating factor, granulocyte colony-stimulating factor, erythropoietin, lymphotoxins, BCG vaccine, *Corynebacterium parvum*, levamisole, polysaccharide K, procodazole, ipilimumab, nivolumab, ramucirumab, ofatumumab, panitumumab, pembrolizumab, obinutuzumab, trastuzumab emtansine, tocilizumab, bevacizumab, trastuzumab, siltuximab, cetuximab, infliximab and rituximab.

The hormone therapy drug is not particularly limited and examples include fosfestrol, diethylstilbestrol, chlorotrianisene, medroxyprogesterone acetate, megestrol acetate, chlormadinone acetate, cyproterone acetate, danazol, allylestrenol, gestrinone, mepartricin, raloxifene, ormeloxifene, levormeloxifene, antiestrogens (e.g., tamoxifen citrate, toremifene citrate, etc.), birth-control pills, mepitiostane, testololactone, aminoglutethimide, LH-RH agonists (e.g., goserelin acetate, buserelin, leuprorelin, etc.), droloxifene, epitiostanol, ethinylestradiol sulfonate, aromatase inhibitors (e.g., fadrozole hydrochloride, anastrozole, letrozole, exemestane, vorozole, formestane, etc.), antiandrogens (e.g., flutamide, bicalutamide, nilutamide, etc.), 5α-reductase inhibitors (e.g., finasteride, episteride, etc.), corticosteroids (e.g., dexamethasone, prednisolone, betamethasone, triamcinolone, etc.) and androgen synthesis inhibitors (e.g., abiraterone, etc.).

In the case where the agent of the present disclosure is used in combination (concomitantly) with the immune checkpoint inhibitor or another anticancer drug, they may be simultaneously administered to a subject or separately administered thereto at some interval. The term "used in combination (concomitantly)" herein means that the period of treatment with one drug overlaps with the period(s) of treatment with another or other drugs, and the two or more drugs are not necessarily required to be simultaneously administered. The dose of the immune checkpoint inhibitor or another anticancer drug can be determined based on the clinical dose of each drug and is appropriately selected depending on the subject, the age and body weight of the subject, the symptoms, the administration time, the dosage form, the administration method, the combination of the drugs, etc.

The present disclosure further includes the following:

a method for promoting vein-like morphological change of tumor vessels, comprising administering a phosphatidylcholine to a mammal;

a phosphatidylcholine for use in promoting vein-like morphological change of tumor vessels;

use of a phosphatidylcholine for production of a vein-formation promoting agent capable of promoting vein-like morphological change of tumor vessels;

a method for enlarging the diameter of tumor vessels, comprising administering a phosphatidylcholine to a mammal;

a phosphatidylcholine for use in enlarging the diameter of tumor vessels;

use of a phosphatidylcholine for production of a vessel-diameter enlarging agent capable of enlarging the diameter of tumor vessels;

a method for promoting connection of tumor vessels to each other without mediation of a lysophospholipid receptor, comprising administering a phosphatidylcholine to a mammal;

a phosphatidylcholine for use in promoting connection of tumor vessels to each other without mediation of a lysophospholipid receptor;

use of a phosphatidylcholine for production of a blood vessel-connection promoting agent capable of promoting connection of tumor vessels to each other without mediation of a lysophospholipid receptor;

a method for promoting infiltration of leukocytes throughout a tumor region without mediation of a lysophospholipid receptor, comprising administering a phosphatidylcholine to a mammal;

a phosphatidylcholine for use in promoting infiltration of leukocytes throughout a tumor region without mediation of a lysophospholipid receptor;

use of a phosphatidylcholine for production of a leukocyte-infiltration promoting agent capable of promoting infiltration of leukocytes throughout a tumor region without mediation of a lysophospholipid receptor;

a method for stimulating antitumor immunity, comprising administering a phosphatidylcholine to a mammal;

a phosphatidylcholine for use in stimulating antitumor immunity without mediation of a lysophospholipid receptor;

use of a phosphatidylcholine for production of an antitumor immunostimulatory agent capable of stimulating antitumor immunity without mediation of a lysophospholipid receptor;

a method for enhancing cancer immunotherapy, comprising administering a phosphatidylcholine to a mammal;

a phosphatidylcholine for use in enhancing cancer immunotherapy without mediation of a lysophospholipid receptor;

use of a phosphatidylcholine for production of a cancer immunotherapy-enhancing agent capable of enhancing cancer immunotherapy without mediation of a lysophospholipid receptor;

a cancer therapeutic agent comprising a phosphatidylcholine as an active ingredient;

a method for treating cancer, comprising administering a phosphatidylcholine to a mammal;

a phosphatidylcholine for use in cancer therapy; and use of a phosphatidylcholine for production of a cancer therapeutic agent.

EXAMPLES

Hereinafter, some examples of the present disclosure will be explained in detail, but the present disclosure is not limited thereto.

Example 1: Effects of Phosphatidylcholine Administration on Tumor (Lung Cancer)

In order to investigate the effects of phosphatidylcholine administration on tumor, phosphatidylcholine (hereinafter referred to as "PC") or a PC-containing purified soybean oil emulsion was administered to tumor-bearing mice generated by subcutaneous inoculation of a mouse cancer cell line, and the antitumor effect, tumor vasculature and intratumoral lymphocyte infiltration were examined.
(1) Experimental Method
(1-1) Cells and Animals Used The mouse cancer cells used were LLC cells (Lewis lung cancer cell line). LLC cells ($1\times10^6$ cells in 100 µL of PBS per animal) were subcutaneously injected into C57BL/6NCrSlc mice aged 8 weeks (females, SLC, Inc.).
(1-2) Substances Administered The PC used was soybean PC (L-α-phosphatidylcholine (95%) (Soy), Avanti POLAR LIPIDS). The soybean PC was dissolved at a concentration of 25 mM in 50% ethanol, and the solution was stored at −30'C. Just before administration, the soybean PC solution was diluted to a concentration for dosing at 3 mg/kg in 100 µL of PBS. The diluted soybean PC solution was administered in a volume of 100 µL per administration via the mouse tail vein. The PC-containing purified soybean oil emulsion used was Intralipos Injection 20% (trade name, Otsuka Pharmaceutical Co., Ltd.). The PC-containing purified soybean oil emulsion was administered in a volume of 100 µL (containing 1.2 mg of purified yolk lecithin) per administration via the mouse tail vein.
(1-3) Grouping and Administration Schedule The mice were assigned to 3 groups: a soybean PC group, an Intralipos group and a control group (non-administration group) (4 animals per group). For 9 consecutive days from day 5 to day 13 post-cancer cell inoculation, 100 µL of Intralipos or 3 mg/kg (100 µL) of the soybean PC was administered once daily via the mouse tail vein with a 27G syringe. On the day following the final administration (day 14 post-inoculation), the tumors were harvested from the mice.
(1-4) Measurement of Tumor Volume Tumor volume was measured on day 5, day 7, day 10 and day 14 post-inoculation. The tumor volume was calculated by the following formula: length×width×height×0.5.
(1-5) Preparation of Tumor Tissue Specimens The harvested tumors were immersed in 4% paraformaldehyde (PFA)/PBS and incubated with agitation at 4° C. overnight for fixation. After fixation, the tumors were washed with cold PBS (4° C.) for 6 hours, during which PBS was replaced with a fresh one every 30 minutes. The tumors were immersed in 15% sucrose/PBS and incubated with agitation at 4° C. for 3 hours. The tumors were then immersed in 30% sucrose/PBS and incubated with agitation at 4° C. for 3 hours. The tumors were embedded in O.C.T. compound (Tissue-Tek) and frozen at −80° C. for 3 days or longer.

(1-6) Observation of Tumor Vasculature The tumors embedded in O.C.T. compound were sectioned at a thickness of 40 µm with a cryostat (Leica). The sections were placed on glass slides and air-dried for about 2 hours with a dryer. The sections were encircled with a liquid blocker. The glass slides were placed in a slide staining tray and washed with PBS at room temperature for 10 minutes to remove the O.C.T. compound. The sections were post-fixed in 4% PFA/PBS at room temperature for 10 minutes and washed with PBS at room temperature for 10 minutes. A blocking solution (5% normal goat serum, 1% BSA and 2% skim milk in PBS) was applied dropwise to the sections, and blocking was performed at room temperature for 20 minutes. As a primary antibody, Purified Hamster Anti-PECAM-1 Antibody (Millipore: MAB1398Z), which is an anti-mouse CD31 antibody, was used. This primary antibody was diluted 200-fold in the blocking solution and applied dropwise to the sections. The sections were incubated at 4'=C overnight. The sections were washed 5 times with PBS containing Tween 20 (PBST) for 10 minutes each time and further with PBS for 10 minutes. As a secondary antibody, Alexa Fluor 488 Goat Anti-Hamster IgG (Jackson ImmunoResearch Laboratories) was used. This secondary antibody was diluted 400-fold in the blocking solution and applied dropwise to the sections. The sections were incubated in a light-shielding condition for 2 hours. The sections were washed 5 times with PBST for 10 minutes each time. Several drops of Vectashield (Vector Laboratories Inc.) were applied to the sections, and glass coverslips were placed over the sections. The coverslipped sections were observed and photographed under a confocal laser microscope (Leica).

(1-7) Examination of Intratumoral Lymphocyte Infiltration

The tumors embedded in O.C.T. compound were sectioned at a thickness of 20 μm with a cryostat (Leica). Post-fixation and blocking were performed according to the same procedure as described above. As a primary antibody, Purified Rat Anti-Mouse CD8 (BioLegend, Inc.: 100801) was used. The primary antibody was diluted 200-fold in the blocking solution and applied dropwise to the sections. The sections were incubated at 4° C. overnight. As a secondary antibody, Goat anti-Rat IgG (H+L) Secondary Antibody, Alexa Fluor 488 conjugate (Thermo Fisher Scientific Inc.: A11006) was used. The secondary antibody was diluted 400-fold in the blocking solution and applied dropwise to the sections. The sections were incubated in a light-shielding condition for 2 hours. The sections were washed with PBST overnight. As third antibodies, Anti-Mouse CD4 PE (eBioscience: 12-0042-83) and APC-conjugated Rat Anti-Mouse CD31 (BD Pharmingen: 551262) were used. The third antibodies were separately diluted 400-fold in the blocking solution and applied dropwise to the sections. The sections were incubated in a light-shielding condition for 2 hours. The sections were washed with PBST overnight. A mounting medium (DAKO mounting medium, DAKO) was applied dropwise to the sections, and glass coverslips were placed over the sections. The coverslipped sections were photographed under a confocal laser microscope (Leica) at 400-fold magnification to obtain confocal images at an optical section thickness of 10 μm. The central region and the edge region of the tumor were separately photographed, and the difference in lymphocyte infiltration between these regions was examined. The number of CD4-positive cells and the number of CD8-positive cells in each image were separately counted, and the respective lymphocyte count per unit area was calculated.

(2) Results (2-1) Tumor Volume

The results are shown in FIG. 1. As is clear from FIG. 1, the soybean PC group and the Intralipos group showed tumor growth inhibition as compared with the control group.

(2-2) Tumor Vasculature

Figure 2:
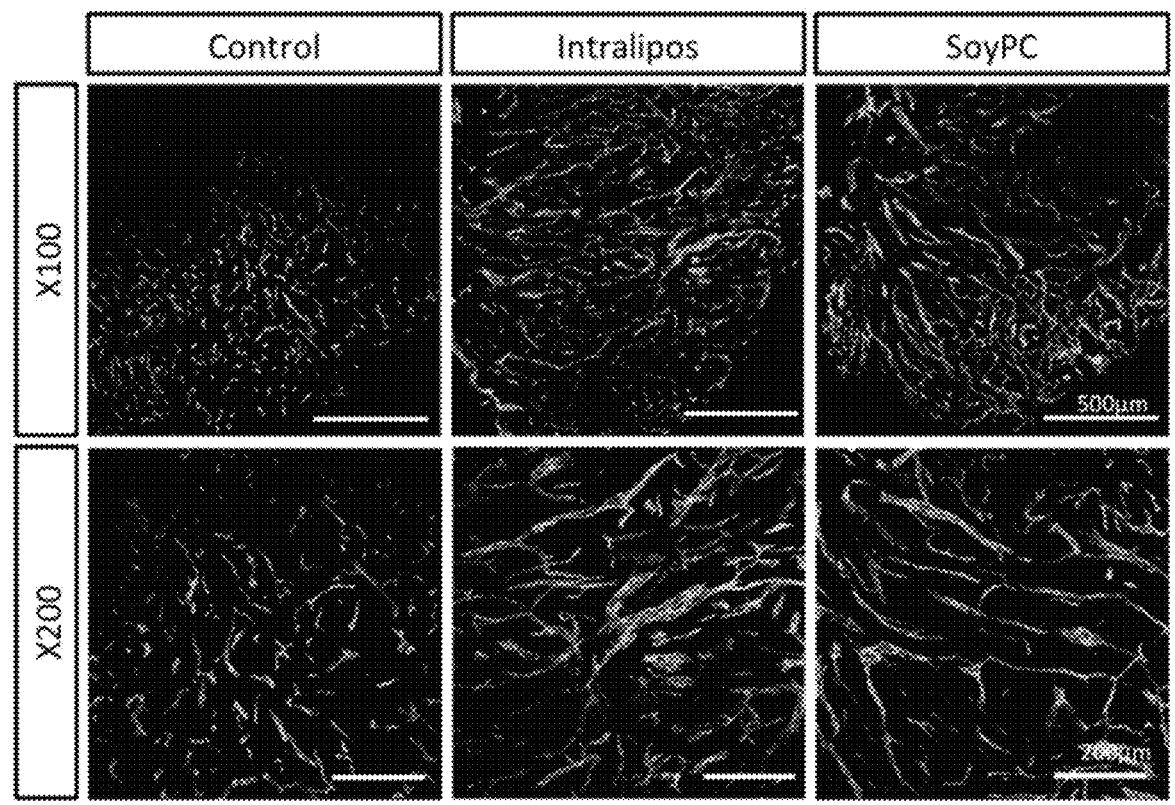
FIG. 2 shows the structural changes of tumor vessels after 9-day administration of soybean phosphatidylcholine or Intralipos Injection 20% (trade name, Otsuka Pharmaceutical Co., Ltd.) to tumor-bearing mice generated by subcutaneous inoculation of LLC cells.

The results are shown in FIG. 2. Vascular endothelial cells are stained in green fluorescence and visualized in white in each image. In the control group, poorly connected blood vessels were observed. In contrast, well connected blood vessels were observed in the soybean PC group and the Intralipos group. In addition, the diameters of most of the blood vessels were enlarged to a vein-like morphology with a diameter of more than 10 μm.

(2-3) Intratumoral Lymphocyte Infiltration

Figure 3:
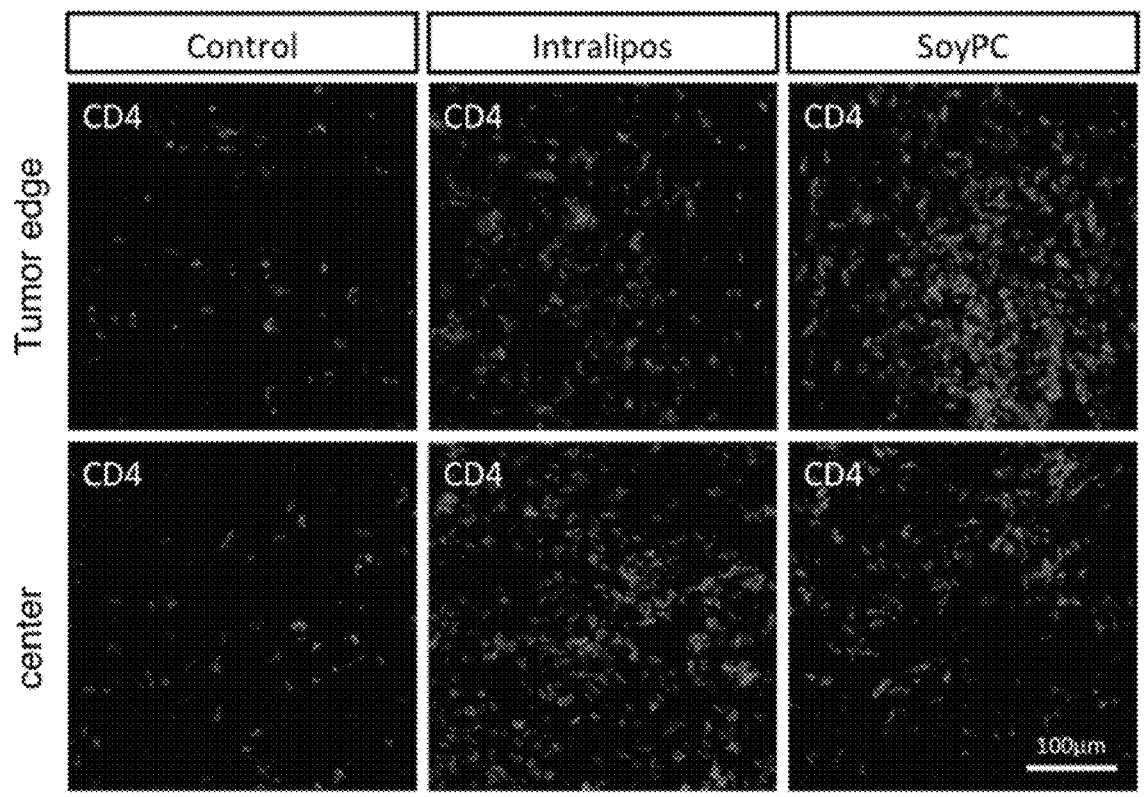
FIG. 3 shows the intratumoral infiltration of CD4-positive cells after 9-day administration of soybean phosphatidylcholine or Intralipos Injection 20% (trade name, Otsuka Pharmaceutical Co., Ltd.) to tumor-bearing mice generated by subcutaneous inoculation of LLC cells.
Figure 4:
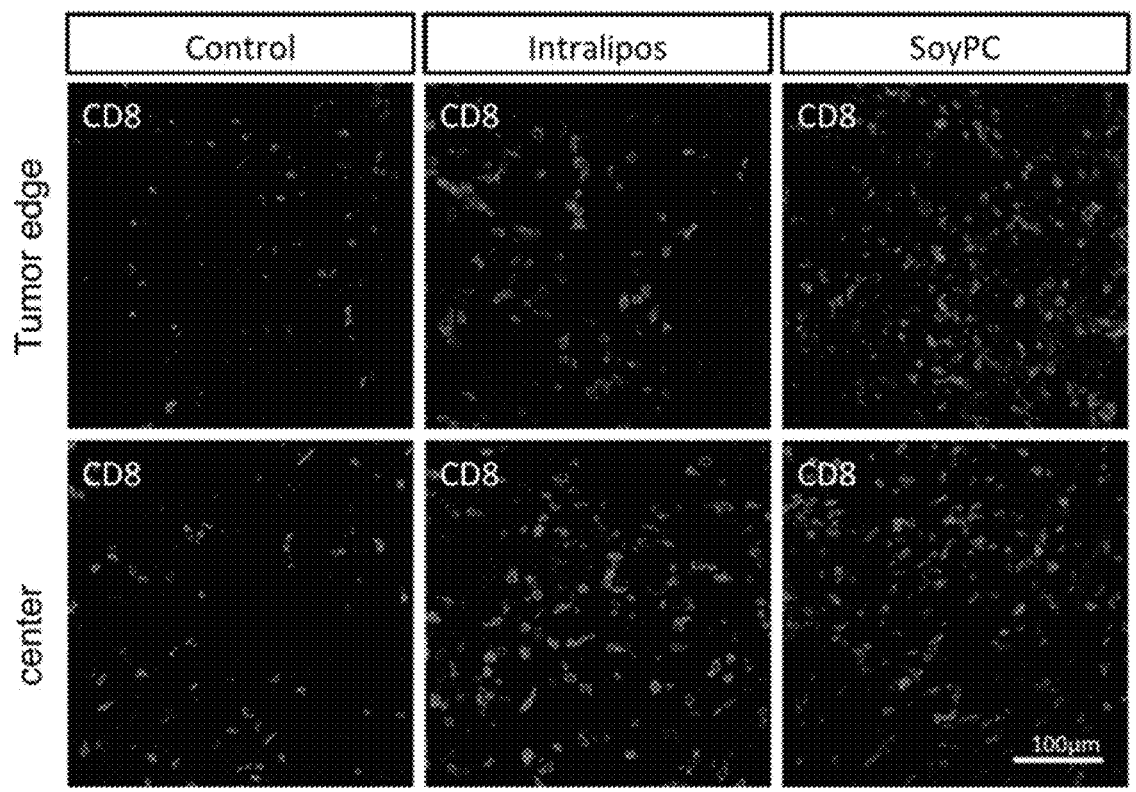
FIG. 4 shows the intratumoral infiltration of CD8-positive cells after 9-day administration of soybean phosphatidylcholine or Intralipos Injection 20% (trade name, Otsuka Pharmaceutical Co., Ltd.) to tumor-bearing mice generated by subcutaneous inoculation of LLC cells.

The results of CD4-positive cells are shown in FIG. 3, and the results of CD8-positive cells are shown in FIG. 4. As is clear from FIGS. 3 and 4, the soybean PC group and the Intralipos group showed diffuse infiltration of both CD4-positive cells and CD8-positive cells into the tumor, evidently indicating the enhancement of antitumor immunity, as distinct from the control group. The numbers of CD4-positive cells in the edge region of the tumor in the soybean PC group and in the Intralipos group were 1.5-fold and 1.2-fold higher than that in the control group, respectively. The numbers of CD4-positive cells in the central region of the tumor in the soybean PC group and in the Intralipos group were 3-fold and 4-fold higher than that in the control group, respectively. The numbers of CD8-positive cells in the edge region of the tumor in the soybean PC group and in the Intralipos group were 2-fold or more higher than that in the control group. Similarly, the numbers of CD8-positive cells in the central region of the tumor in the soybean PC group and in the Intralipos group were 2-fold or more higher than that in the control group.

(2-4) Conclusion

As is known in the art, inflammatory cells, such as lymphocytes, migrate across venules, which are blood vessels larger than capillaries, to enter tissues, as previously described. The results of Example 1 show that PC helps the formation of a connected vascular network, thereby improving intratumoral blood flow as well as induces vein-like morphological change of tumor vessels, and via these effects, promotes infiltration of lymphocytes into tumor tissue, resulting in tumor growth inhibition.

Reference Example 1: Comparison with Lysophosphatidylcholine Administration

An experiment was performed to examine whether administration of lysophosphatidylcholine (hereinafter referred to as "LPC"), which is a decomposition product of PC, would induce vein-like morphological change of intratumoral vasculature as with the administration of PC.

(1) Experimental Method

The same experiment as described in Example 1 was performed except that LPC (manufactured by Avanti POLAR LIPIDS; 1-oleoyl-2-hydroxy-sn-glycero-3-phosphocholine) and soybean PC (the same as in Example 1) were administered. An LPC solution was prepared at a concentration for dosing at 3 mg/kg in 100 μL in the same manner as for the soybean PC solution in Example 1. The LPC solution was administered in a volume of 100 μL per administration via the mouse tail vein.

(2) Results

Figure 5:
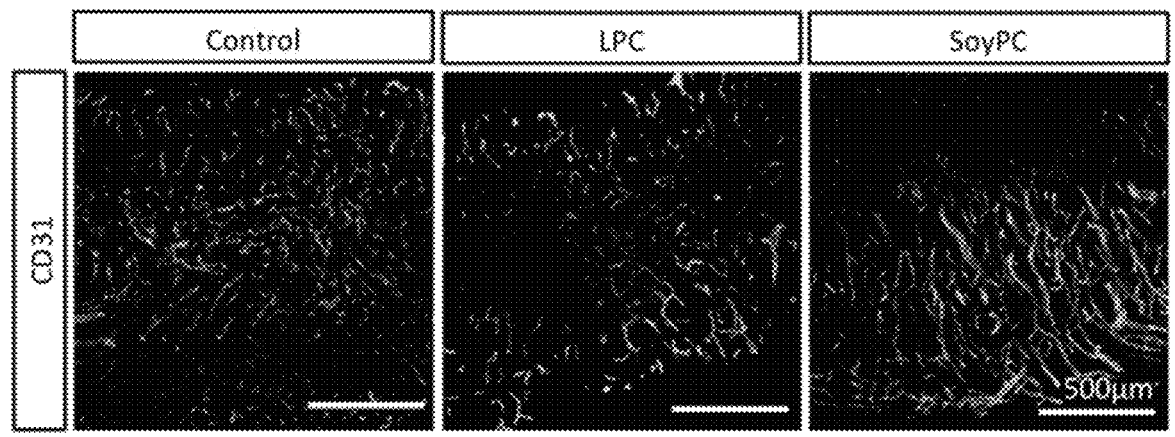
FIG. 5 shows the structural changes of tumor vessels after 9-day administration of soybean phosphatidylcholine or lysophosphatidylcholine to tumor-bearing mice generated by subcutaneous inoculation of LLC cells.

The results are shown in FIG. 5. Unlike the soybean PC group, the LPC group did not show any structural change of intratumoral vessels. These results revealed that the structural change of intratumoral vessels is induced by PC itself, not after PC is decomposed into LPC. That is, the mechanism to stimulate antitumor immunity in the present disclosure is different from that in the prior invention, which mediates a lysophospholipid receptor.

Phosphatidylcholine has been proven safe for use in administration to a living body. The above findings show that phosphatidylcholine is capable of promoting infiltration of immune cells throughout a tumor region, thus enhancing tumor cell killing by the immune cells, such as cytotoxic T cells. Also shown is that intratumoral infiltration of CD4-positive cells contributes to creating a condition allowing antigen presentation of molecules expressed in tumor cells. Moreover, phosphatidylcholine causes no damage to blood vessels in normal tissue and therefore has a very low risk of side effects. Phosphatidylcholine seems to exert such functions regardless of the type of cancer and is therefore potentially applicable to any type of cancer. Particularly, phosphatidylcholine is expected to exert remarkable effect on a type of cancer characterized by low blood flow (pancreatic cancer etc.).

Example 2: Effects of Phosphatidylcholine Administration on Colon Cancer (1) Experimental Method (1-1) Cells and Animals Used The mouse cancer cells used were colon-26 cells (mouse colon cancer cell line). Colon-26 cells ($1 \times 10^4$ cells in 100 μL of PBS per animal) were subcutaneously injected into Balb/c mice aged 8 weeks (females, SLC, Inc.).

(1-2) Substance Administered

The same soybean PC as in Example 1 was used. In the same manner as in Example 1, just before administration, the soybean PC solution was diluted to a concentration for dosing at 3 mg/kg in 100 μL of PBS. The diluted soybean PC solution was administered in a volume of 100 μL per administration via the mouse tail vein.

(1-3) Grouping and Administration Schedule

The mice were assigned to 2 groups: a soybean PC group and a control group (vehicle administration group) (3 animals per group). For 7 consecutive days from day 7 to day 13 post-cancer cell inoculation, 3 mg/kg (100 μL) of the soybean PC was administered once daily via the mouse tail vein. On the day following the final administration (day 14 post-inoculation), the tumors were harvested from the mice.

(1-4) Preparation of Tumor Tissue Specimens, Observation of Tumor Vasculature, and Examination of Intratumoral Lymphocyte Infiltration In the same manner as in Example 1, tumor tissue specimens were prepared, tumor vasculature was observed, and intratumoral lymphocyte infiltration was examined.

(2) Results (2-1) Tumor Vasculature

Figure 6:
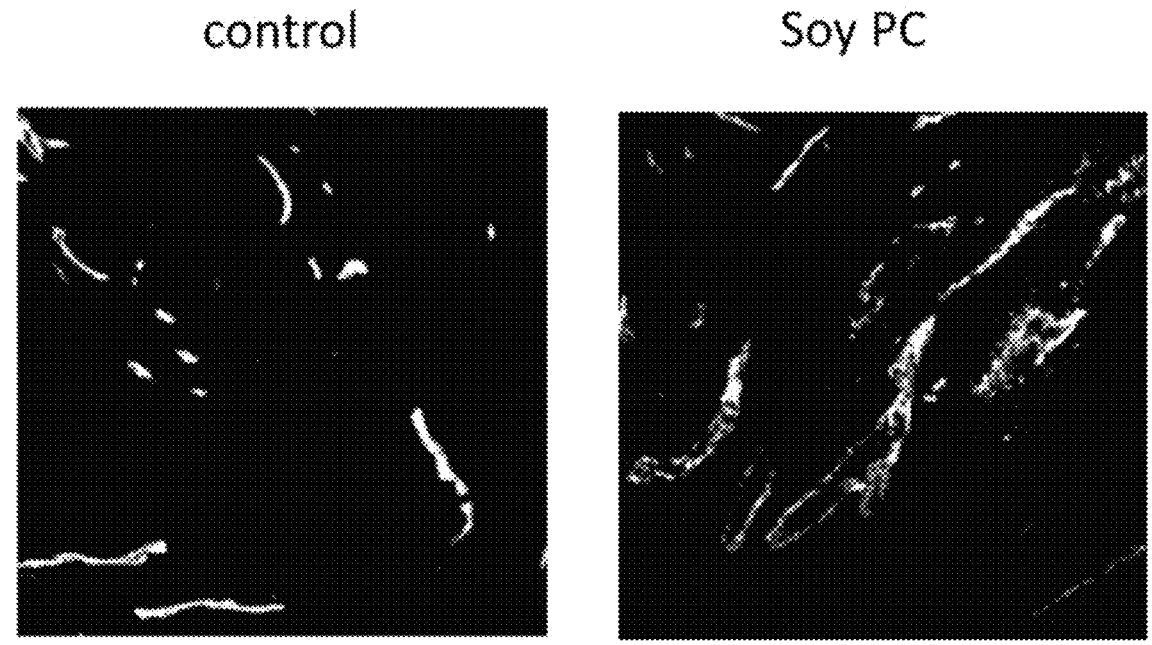
FIG. 6 shows the structural changes of tumor vessels after 7-day administration of soybean phosphatidylcholine to tumor-bearing mice generated by subcutaneous inoculation of colon-26 cells (mouse colon cancer cell line).

The results are shown in FIG. 6. Similarly to the results of Example 1, the soybean PC group showed well connected blood vessels having a vein-like morphology with a large diameter.

(2-2) Intratumoral Lymphocyte Infiltration

Figure 7:
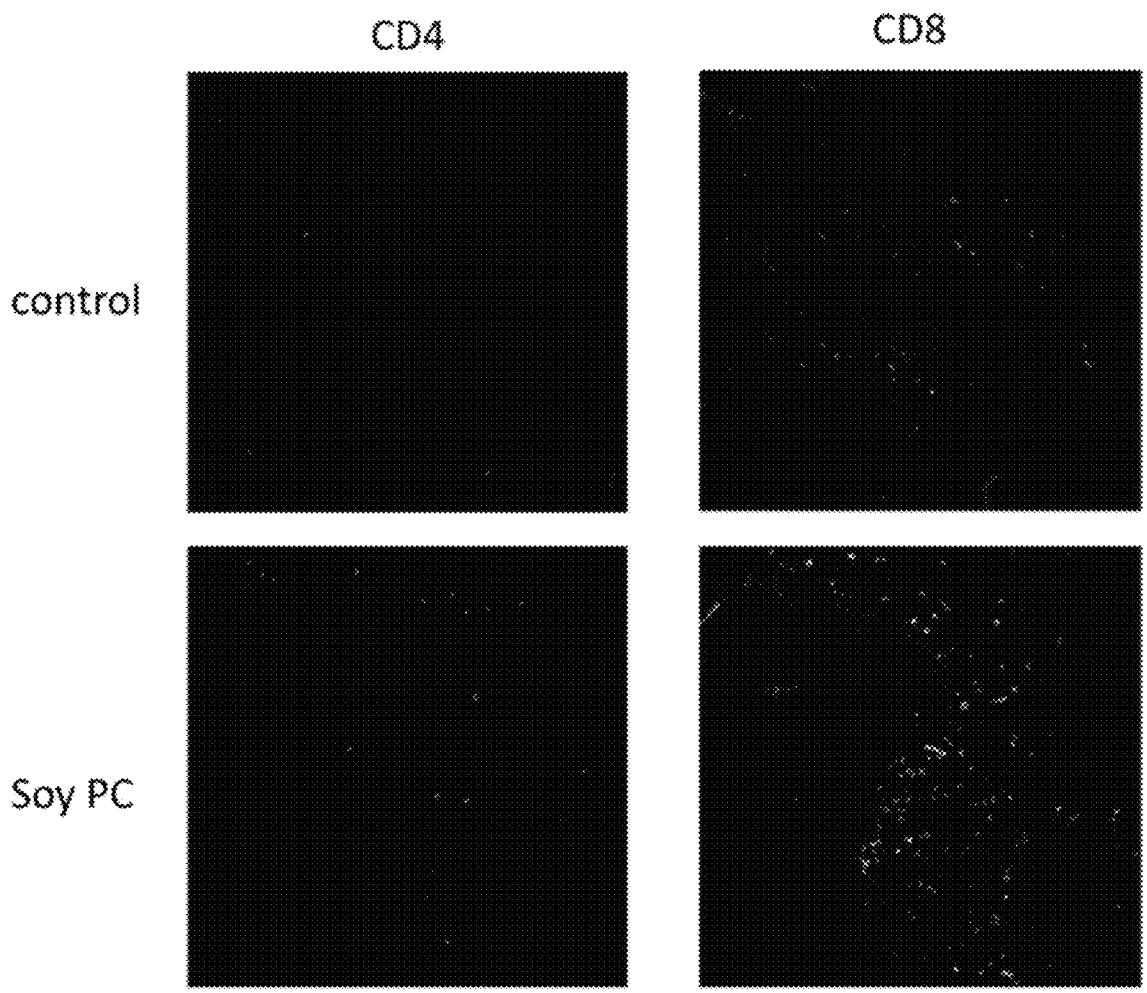
FIG. 7 shows the intratumoral infiltration of CD4-positive cells and CD8-positive cells after 7-day administration of soybean phosphatidylcholine to tumor-bearing mice generated by subcutaneous inoculation of colon-26 cells (mouse colon cancer cell line).

The results are shown in FIG. 7. The left panels show the results of CD4-positive cells, and the right panels show the results of CD8-positive cells. Similarly to the results of Example 1, the soybean PC group showed infiltration of both CD4-positive cells and CD8-positive cells into the tumor.

Example 3: Effects of Phosphatidylcholine Administration on Melanoma (1) Experimental Method (1-1) Cells and Animals Used The mouse cancer cells used were B16 cells (mouse melanoma cell line). B16 cells ($1\times10^6$ cells in 100 μL of PBS per animal) were subcutaneously injected into C57BL/6NCrSlc mice aged 8 weeks (females, SLC, Inc.).

(1-2) Substance Administered

The same soybean PC as in Example 1 was used. In the same manner as in Example 1, just before administration, the soybean PC solution was diluted to a concentration for dosing at 3 mg/kg in 100 μL of PBS. The diluted soybean PC solution was administered in a volume of 100 μL per administration via the mouse tail vein.

(1-3) Grouping and Administration Schedule

The mice were assigned to 2 groups: a soybean PC group and a control group (vehicle administration group) (3 animals per group). For 7 consecutive days from day 5 to day 11 post-cancer cell inoculation, 3 mg/kg (100 μL) of the soybean PC was administered once daily via the mouse tail vein. On the day following the final administration (day 12 post-inoculation), the tumors were harvested from the mice.

(1-4) Preparation of Tumor Tissue Specimens, Observation of Tumor Vasculature, and Examination of Intratumoral Lymphocyte Infiltration In the same manner as in Example 1, tumor tissue specimens were prepared, tumor vasculature was observed, and intratumoral lymphocyte infiltration was examined.

(2) Results (2-1) Tumor Vasculature

Figure 8:
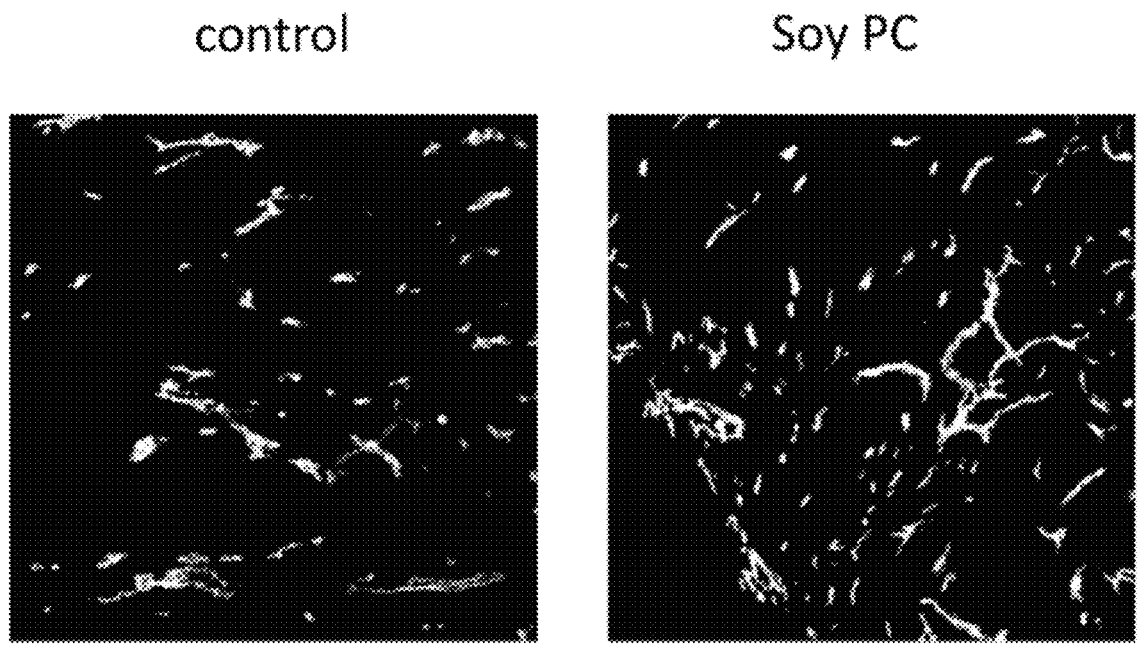
FIG. 8 shows the structural changes of tumor vessels after 7-day administration of soybean phosphatidylcholine to tumor-bearing mice generated by subcutaneous inoculation of B16 cells (mouse melanoma cell line).

The results are shown in FIG. 8. Similarly to the results of Examples 1 and 2, the soybean PC group showed well connected blood vessels having a vein-like morphology with a large diameter.

(2-2) Intratumoral Lymphocyte Infiltration

Figure 9:
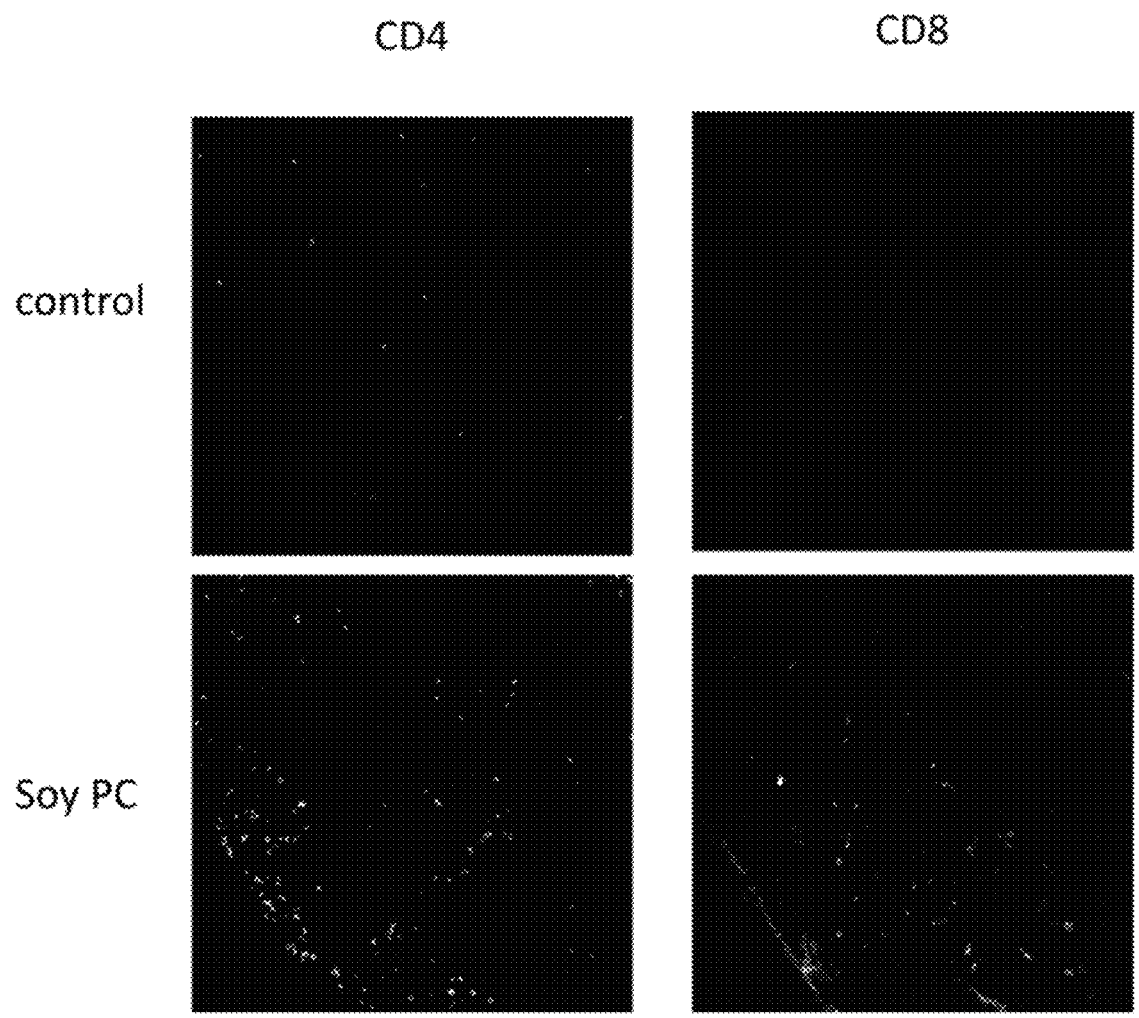
FIG. 9 shows the intratumoral infiltration of CD4-positive cells and CD8-positive cells after 7-day administration of soybean phosphatidylcholine to tumor-bearing mice generated by subcutaneous inoculation of 816 cells (mouse melanoma cell line).

The results are shown in FIG. 9. The left panels show the results of CD4-positive cells, and the right panels show the results of CD8-positive cells. Similarly to the results of Examples 1 and 2, the soybean PC group showed infiltration of both CD4-positive cells and CD8-positive cells into the tumor.

The results of Examples 2 and 3 demonstrate that PC exhibits effects similar to those observed in Example 1 despite the difference in the type of cancer and the strain of mice. In conclusion, the effects of PC on intratumoral vessels and lymphocyte infiltration can be exerted regardless of the type of cancer.

Example 4: Combined Effect of Phosphatidylcholine and Immune Checkpoint Inhibitor on Lewis Lung Cancer (1) Experimental Method (1-1) Cells and Animals Used The cells used were LLC cells (Lewis lung cancer cell line). LLC cells ($1\times10^4$ cells in 100 μL of PBS per animal) were subcutaneously injected into C57BL/6NCrSlc mice aged 8 weeks (females, SLC, Inc.).

(1-2) Substances Administered

The same soybean PC as in Example 1 was used. In the same manner as in Example 1, just before administration, the soybean PC solution was diluted to a concentration for dosing at 3 mg/kg in 100 μL of PBS. The diluted soybean PC solution was administered in a volume of 100 μL per administration via the mouse tail vein. An anti-PD-1 antibody (Bio X cell) was used as an immune checkpoint inhibitor.

(1-3) Grouping and Administration Schedule

The mice were assigned to 4 groups: a soybean PC group, an anti-PD-1 antibody group, a soybean PC plus anti-PD-1 antibody group, and a control group (vehicle administration group) (3 animals per group). For 13 consecutive days from day 7 to day 20 post-cancer cell inoculation, 3 mg/kg (100 μL) of the soybean PC was administered once daily via the mouse tail vein. The anti-PD-1 antibody was intraperitoneally administered at a dose of 200 μg/mouse on day 7, day 9, day 11, day 14, day 16 and day 18 post-cancer cell inoculation.

(1-4) Measurement of Tumor Volume

Tumor volume was measured on day 7, day 14 and day 21 post-cancer cell inoculation. The tumor volume was calculated by the following formula: length×width×height×0.5.

(2) Results

Figure 10:
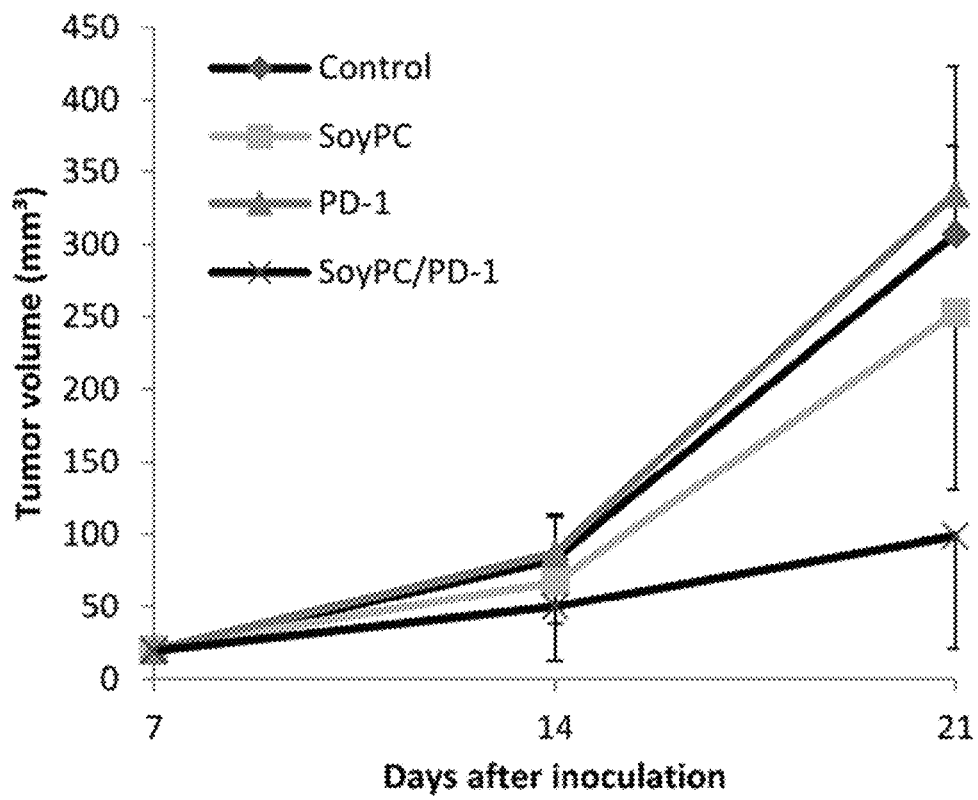
FIG. 10 shows the tumor growth inhibitory effect of combined administration of soybean phosphatidylcholine and an anti-PD-1 antibody to tumor-bearing mice generated by subcutaneous inoculation of LLC cells.

The measurement results of the tumor volume are shown in FIG. 10. According to previous reports, anti-PD-1 antibodies alone are not effective against Lewis lung cancer. In accord with the previous reports, the anti-PD-1 antibody group in the present experiment did not show tumor growth inhibition. On the other hand, the soybean PC group showed tumor growth inhibition, and the soybean PC plus anti-PD-1 antibody group showed remarkable tumor growth inhibition, which was considered due to a synergistic effect by the combined use of these substances.

Figure 11:
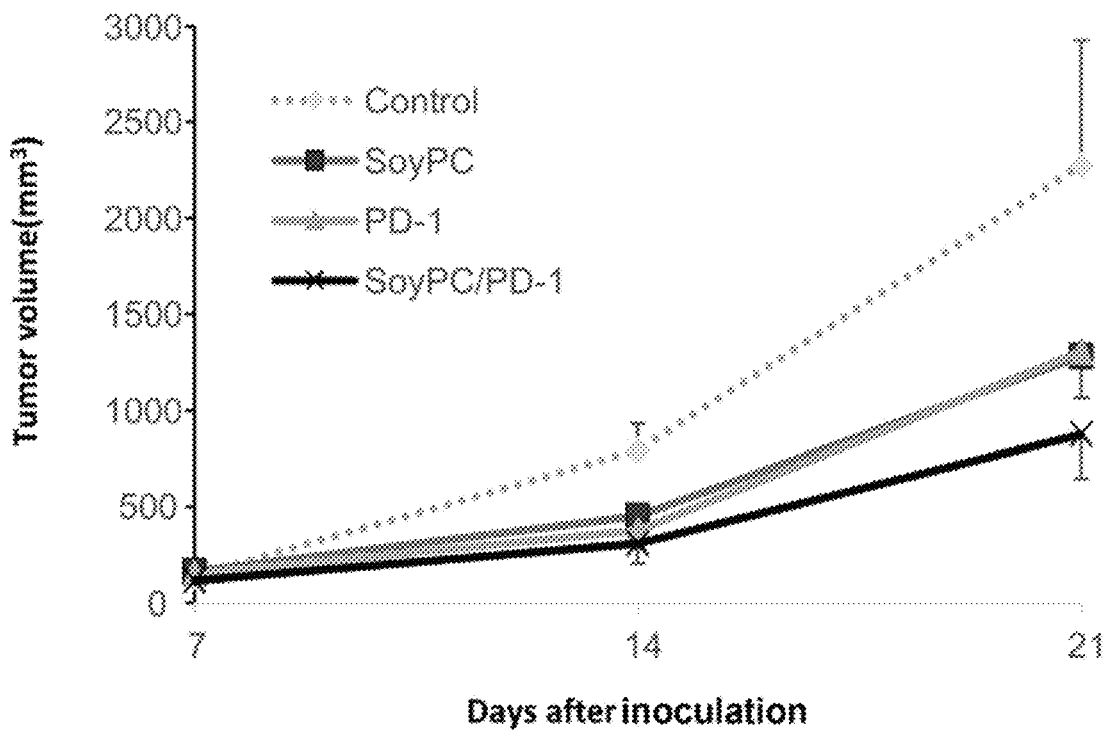
FIG. 11 shows the tumor growth inhibitory effect of combined administration of soybean phosphatidylcholine and an anti-PD-1 antibody to tumor-bearing mice generated by subcutaneous inoculation of colon-26 cells.

Example 5: Combined Effect of Phosphatidylcholine and Immune Checkpoint Inhibitor on Colon Cancer (1) Experimental Method
(1-1) Cells and Animals Used The cells used were colon-26 cells (mouse colon cancer cell line). Colon-26 cells ($1\times10^6$ cells in 100 μL of PBS per animal) were subcutaneously injected into Balb/c mice aged 8 weeks (females, SLC, Inc.).
(1-2) Substances Administered The same soybean PC as in Example 1 was used. In the same manner as in Example 1, just before administration, the soybean PC solution was diluted to a concentration for dosing at 3 mg/kg in 100 μL of PBS. The diluted soybean PC solution was administered in a volume of 100 μL per administration via the mouse tail vein. An anti-PD-1 antibody (Bio X cell) was used as an immune checkpoint inhibitor.
(1-3) Grouping and Administration Schedule The mice were assigned to 4 groups: a soybean PC group, an anti-PD-1 antibody group, a soybean PC plus anti-PD-1 antibody group, and a control group (vehicle administration group) (3 animals per group). For 13 consecutive days from day 7 to day 20 post-cancer cell inoculation, 3 mg/kg (100 μL) of the soybean PC was administered once daily via the mouse tail vein. The anti-PD-1 antibody was intraperitoneally administered at a dose of 200 μg/mouse on day 7, day 9, day 11, day 14, day 16 and day 18 post-cancer cell inoculation.
(1-4) Measurement of Tumor Volume Tumor volume was measured on day 7, day 14 and day 21 post-cancer cell inoculation. The tumor volume was calculated by the following formula: length×width×height×0.5.
(2) Results The measurement results of the tumor volume are shown in FIG. 11. Similarly to the results of Example 4, the soybean PC group and the anti-PD-1 antibody group showed tumor growth inhibition, and the soybean PC plus anti-PD-1 antibody group showed remarkable tumor growth inhibition.

The results of Examples 4 and 5 demonstrate that PC induces intratumoral infiltration of lymphocytes and the immune checkpoint inhibitor stimulates the lymphocytes, thereby remarkably enhancing the antitumor effect of the lymphocytes regardless of the type of cancer.

Example 6: Combined Effect of Phosphatidylcholine and Immune Cell Infusion Therapy on Colon Cancer Currently available clinical tumor immunotherapies include immune cell infusion therapy besides immune checkpoint inhibitor therapy. The immune cell infusion therapy involves in vitro proliferation or stimulation of immune cells, such as lymphocytes, collected from a cancer patient, and subsequent administration of the immune cells back to the cancer patient with the aim of enhancing antitumor immunity. However, since intratumoral infiltration of lymphocytes is limited in cancer patients, the requirement to efficiently perform immune cell infusion therapy is to precondition intratumoral vessels to facilitate intratumoral lymphocyte infiltration. In this study, an experiment was performed to examine whether intratumoral lymphocyte infiltration would be promoted in cancer-bearing mice having received PC administration followed by intravenous administration of lymphocytes.

(1) Experimental Method
(1-1) Cells and Animals Used

Figure 12:
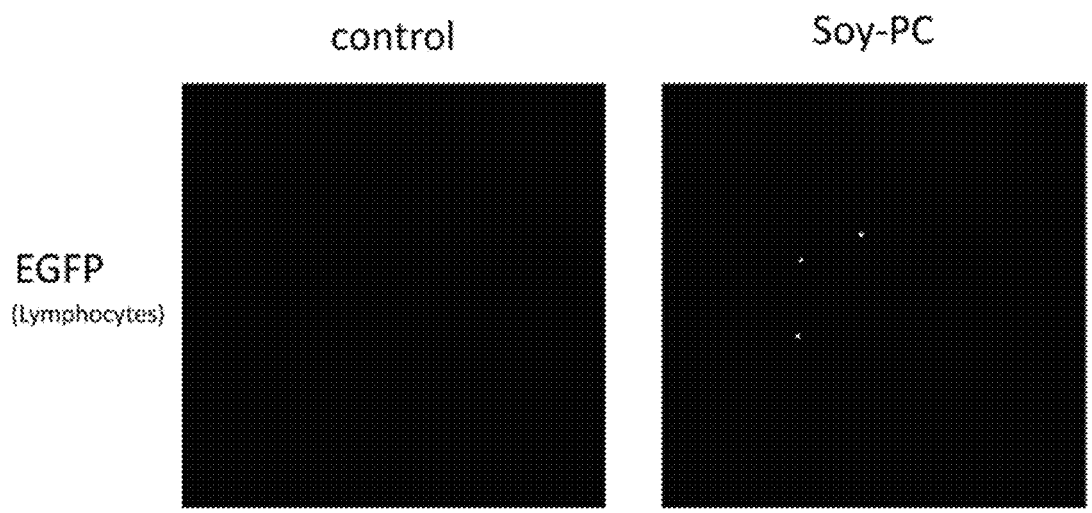
FIG. 12 shows the intratumoral infiltration of exogenous lymphocytes administered intravenously on the day following the final day of 7-day administration of soybean phosphatidylcholine to tumor-bearing mice generated by subcutaneous inoculation of colon-26 cells. The exogenous lymphocytes were lymphocytes collected from other mice.

The cells used were colon-26 cells (mouse colon cancer cell line). Colon-26 cells ($1\times10^6$ cells in 100 μL of PBS per animal) were subcutaneously injected into Balb/c mice aged 8 weeks (females, SLC, Inc.).
(1-2) Substance Administered The same soybean PC as in Example 1 was used. In the same manner as in Example 1, just before administration, the soybean PC solution was diluted to a concentration for dosing at 3 mg/kg in 100 μL of PBS. The diluted soybean PC solution was administered in a volume of 100 μL per administration via the mouse tail vein.
(1-3) Preparation of Lymphocytes Lymphocytes were harvested from the spleens of transgenic mice (C57BL/6-Tg (CAG-EGFP), SLC, Inc.), which express green fluorescence in cells in most of the tissues throughout the body, and a lymphocyte suspension was prepared.
(1-4) Grouping and Administration Schedule The mice were assigned to 2 groups: a soybean PC group and a control group (vehicle administration group) (3 animals per group). For 7 consecutive days from day 7 to day 13 post-cancer cell inoculation, 3 mg/kg (100 μL) of the soybean PC was administered once daily via the mouse tail vein. On the day following the final administration (day 14 post-inoculation), the lymphocyte suspension ($5\times10^6$ cells) was administered via the tail vein. The tumors were harvested from the mice at 1 hour after the lymphocyte administration.
(1-5) Preparation of Tumor Tissue Specimens and Examination of Intratumoral Lymphocyte Infiltration Tumor tissue specimens were prepared in the same manner as in Example 1. Lymphocyte intratumoral infiltration was examined in the same manner as in Example 1 except that an anti-EGFP antibody (MBL Life science) was used as the antibody.
(2) Results The results are shown in FIG. 12. The control group showed little infiltration of the intravenously administered lymphocytes into the tumor. In contrast, the soybean PC group showed intratumoral infiltration of the intravenously administered lymphocytes.

Example 7: Combined Effect of Phosphatidylcholine and Immune Cell Infusion Therapy on Melanoma Intratumoral infiltration of lymphocytes administered intravenously was examined in the same manner as in Example 6 except that B16 cells (mouse melanoma cell line) and C57BL/6NCrSlc mice were used.

Figure 13:
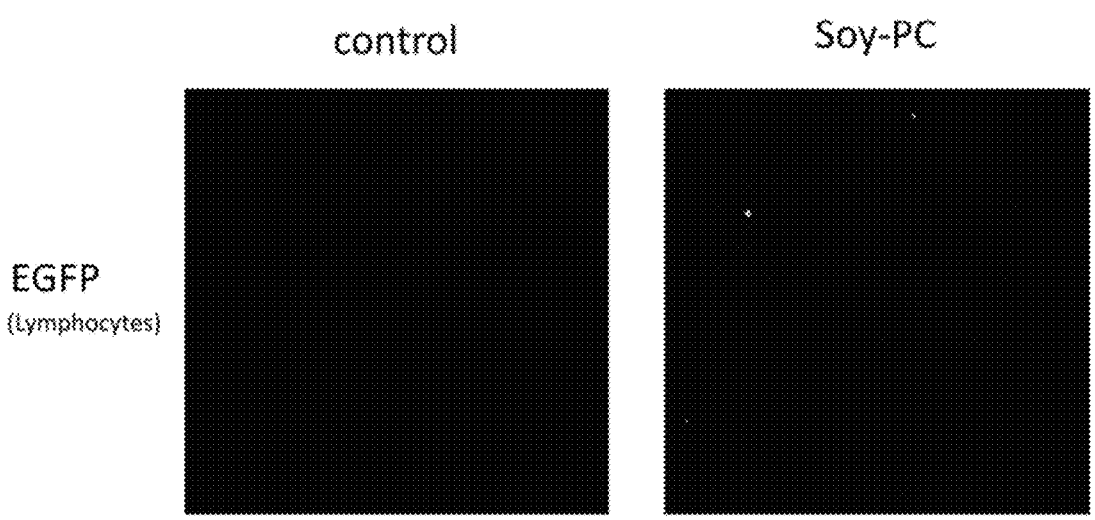
FIG. 13 shows the intratumoral infiltration of exogenous lymphocytes administered intravenously on the day following the final day of 7-day administration of soybean phosphatidylcholine to tumor-bearing mice generated by subcutaneous inoculation of B16 cells. The exogenous lymphocytes were lymphocytes collected from other mice.

The results are shown in FIG. 13. Similarly to the results of Example 6, the control group showed little infiltration of the intravenously administered lymphocytes into the tumor, whereas the soybean PC group showed intratumoral infiltration of the intravenously administered lymphocytes.

Example 8: Combined Effect of Phosphatidylcholine and Immune Cell Infusion Therapy on Lewis Lung Cancer Intratumoral infiltration of lymphocytes administered intravenously was examined in the same manner as in Example 6 except that LLC cells (Lewis lung cancer cell line) and C57BL/6NCrSlc mice were used.

Figure 14:
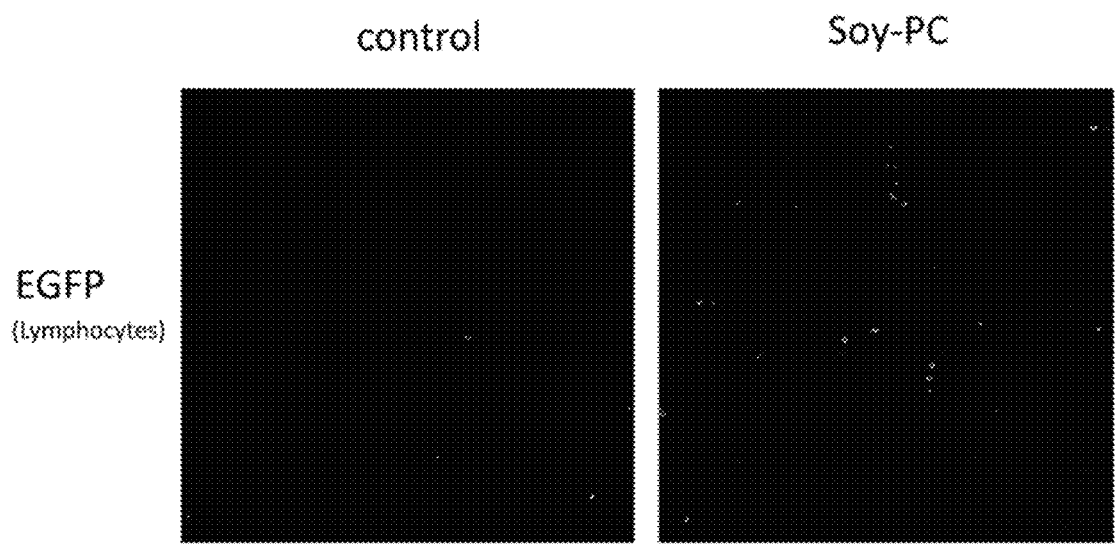
FIG. 14 shows the intratumoral infiltration of exogenous lymphocytes administered intravenously on the day following the final day of 7-day administration of soybean phosphatidylcholine to tumor-bearing mice generated by subcutaneous inoculation of LLC cells. The exogenous lymphocytes were lymphocytes collected from other mice.

The results are shown in FIG. 14. Similarly to the results of Example 6, the control group showed little infiltration of the intravenously administered lymphocytes into the tumor, whereas the soybean PC group showed intratumoral infiltration of the intravenously administered lymphocytes.

The results of Examples 6, 7 and 8 demonstrate that PC-mediated preconditioning of intratumoral vessels to facilitate lymphocyte infiltration can enhance the antitumor effect of the intravenously administered lymphocytes. Moreover, since such enhancement of the antitumor effect was observed similarly in different types of cancers and different strains of mice, PC is expected to enhance the efficacy of tumor immunotherapy in human populations with different immune status and different genetic backgrounds. In recent years, as a therapeutic approach to enhance antitumor immunity, administration of lymphocytes obtained by induced differentiation of iPS cells, ES cells or hematopoietic stem cells has been suggested. Also in such a therapeutic approach, which uses lymphocytes derived from undifferentiated cells, it is considered useful to precondition tumor vessels with the use of PC.

Example 9: Examination of Effects of Various Phosphatidylcholines

As is known in the art, soybean PC is a heterogenous mixture of phosphatidylcholines having fatty acids of different lengths and degrees of unsaturation. In this study, in order to examine whether any PC would produce the same effects as those of soybean PC, various PCs were tested in cancer-bearing mice.

The PCs were classified into the following two groups (see Table 1).
Group A: PCs in which the two fatty acids are the same.
Group B: PCs in which the two fatty acids are different from each other.

The PCs of Group A were dioctanoyl phosphatidylcholine (Avanti POLAR LIPIDS), dimyristoyl phosphatidylcholine (Nippon Fine Chemical), distearoyl phosphatidylcholine (Nippon Fine Chemical), dioleoyl phosphatidylcholine (Nippon Fine Chemical) and dilinoleoyl phosphatidylcholine (Avanti POLAR LIPIDS). The PCs of Group B were (1-palmitoyl-2-myristoyl) phosphatidylcholine (Avanti POLAR LIPIDS) and (1-palmitoyl-2-oleoyl) phosphatidylcholine (Avanti POLAR LIPIDS).

In the same manner as in Example 1, LLC cells ($1\times10^6$ cells in 100 µL of PBS per animal) were subcutaneously injected into C57BL/6NCrSlc mice aged 8 weeks (females, SLC, Inc.) to generate cancer-bearing mice. For 7 consecutive days from day 7 to day 13 post-cancer cell inoculation, the PCs indicated above were administered at a dose of 3 mg/kg (100 µL) once daily via the mouse tail vein. The vehicle was administered to the mice of the control group. On the day following the final administration (day 14 post-inoculation), the tumors were harvested from the mice. In the same manner as in Example 1, tumor tissue sections were prepared, tumor vasculature was observed, and intratumoral lymphocyte infiltration was examined.

Figure 15:
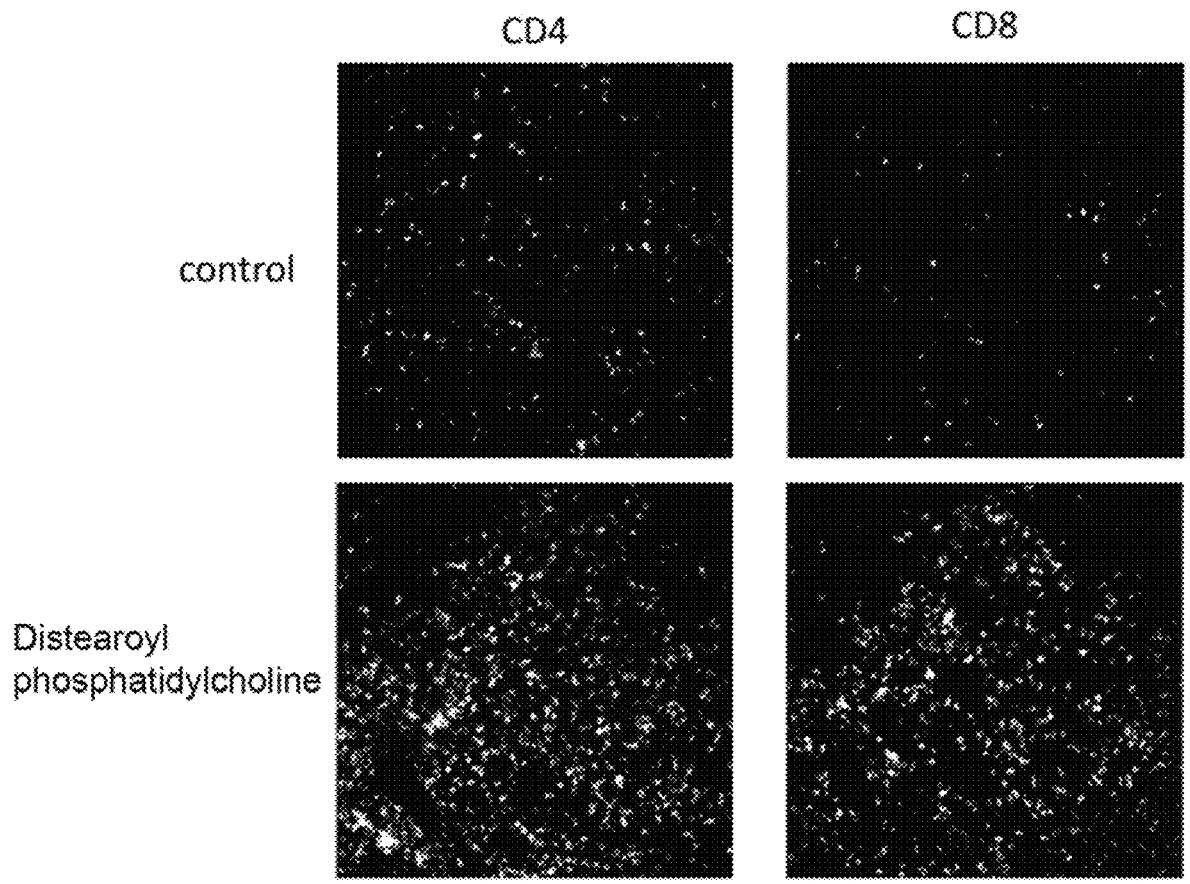
FIG. 15 shows the intratumoral infiltration of CD4-positive cells and CD8-positive cells after 7-day administration of distearoyl phosphatidylcholine to tumor-bearing mice generated by subcutaneous inoculation of LLC cells.

The results of intratumoral lymphocyte infiltration are shown in Table 1. In all the PC administration groups, intratumoral infiltration of both CD4-positive cells and CD8-positive cells were promoted. As a representative example, the results of the administration of distearoyl phosphatidylcholine of Group A are shown in FIG. 15. Also in the specimens of the other PC administration groups, similar images were obtained. The results of the observation of tumor vasculature showed that proliferation of blood vessels with a vein-like morphology was observed in all the PC administration groups. In addition, the results of the measurement of the tumor volume after the 7-day PC administration showed that tumor growth was inhibited in all the PC administration groups as compared with the control group.

TABLE 1

| Group | Name of phosphatidylcholine | Lymphocyte Infiltration |
|---|---|---|
| A | Dioctanoyl phosphatidylcholine | yes |
| | Dimyristoyl phosphatidylcholine | yes |
| | Distearoyl phosphatidylcholine | yes |
| | Dioleoyl phosphatidylcholine | yes |
| | Dilinoleoyl phosphatidylcholine | yes |
| B | (1-Palmitoyl-2-myristoyl) phosphatidylcholine | yes |
| | (1-Palmitoyl-2-oleoyl) phosphatidylcholine | yes |

Example 10: Improving Effect of Phosphatidylcholine on Intratumoral Hypoxia

LLC cells ($1\times10^6$ cells in 100 µL of PBS per animal) were subcutaneously injected into C57BL/6NCrSlc mice aged 8 weeks (females, SLC, Inc.) to generate cancer-bearing mice. In the same manner as in Example 1, soybean PC or Intralipos was administered once daily via the mouse tail vein for 7 consecutive days from day 7 to day 13 post-cancer cell inoculation. The vehicle was administered to the mice of the control group. On day 14 post-tumor cell inoculation, pimonidazole (Hypoxyprobe, Burlington, Mass., USA) was intraperitoneally administered at a dose of 60 mg/kg (100 ILL), and 2 hours later, the tumors were harvested from the mice. Tumor tissue sections were prepared in the same manner as in Example 1, and the hypoxic area was visualized with an anti-pimonidazole antibody.

Figure 16:
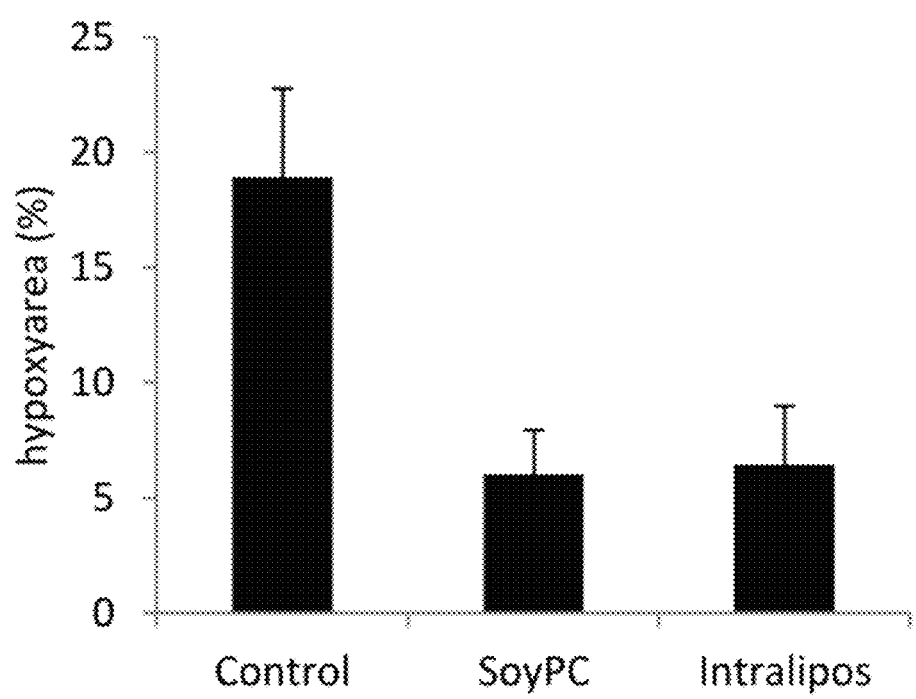
FIG. 16 shows the intratumoral hypoxic area after 7-day administration of soybean phosphatidylcholine or Intralipos Injection 20% (trade name, Otsuka Pharmaceutical Co., Ltd.) to tumor-bearing mice generated by subcutaneous inoculation of LLC cells.

The results are shown in FIG. 16. As is clear from FIG. 16, the hypoxic area was significantly diminished in the soybean PC group and the Intralipos group, as compared with the control group. This shows the improvement of intratumoral blood flow by PC administration. Since hypoxia in cancerous tissue is considered to cause mutations in the chromosomal DNAs of cancer cells and to induce malignant transformation of cancer cells, the improvement of blood flow by PC is expected to potentially inhibit malignant transformation of cancer cells.

Example 11: Promoting Effect of Phosphatidylcholine on Intratumoral Drug Delivery LLC cells ($1\times10^6$ cells in 100 µL of PBS per animal) were subcutaneously injected into C57BL/6NCrSlc mice aged 8 weeks (females, SLC, Inc.) to generate cancer-bearing mice. In the same manner as in Example 1, soybean PC or Intralipos was administered once daily via the mouse tail vein for 7 consecutive days from day 7 to day 13 post-cancer cell inoculation. Nothing was administered to the mice of the control group. On day 14 post-tumor cell inoculation, doxorubicin (Nippon Kayaku Co., Ltd.), which is an anticancer drug emitting red fluorescence, was intravenously administered at a dose of 3 mg/100 µL, and 20 minutes later, the tumors were harvested from the mice. Tumor tissue sections were prepared in the same manner as in Example 1 and observed for the red fluorescent substance (doxorubicin) in the tumors.

Figure 17:
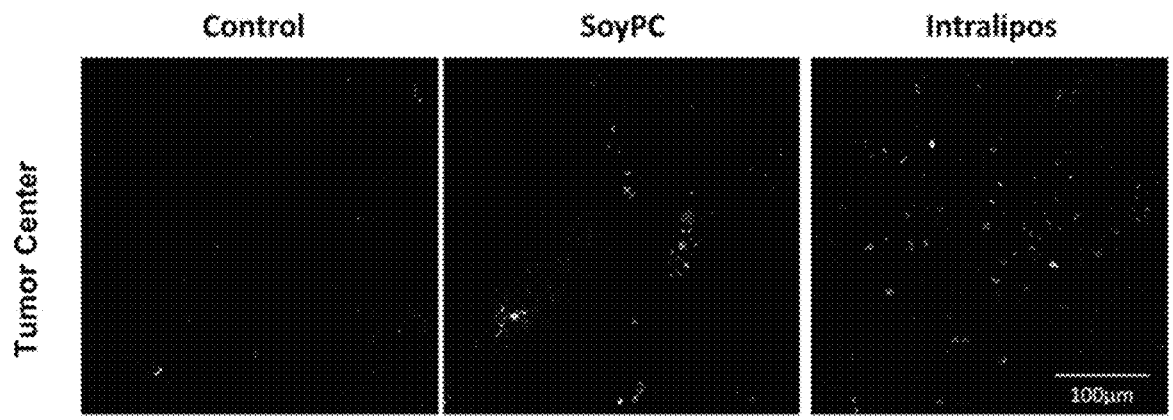
FIG. 17 shows the intratumoral penetration of doxorubicin administered on the day following the final day of 7-day administration of soybean phosphatidylcholine or Intralipos Injection 20% (trade name, Otsuka Pharmaceutical Co., Ltd.) to tumor-bearing mice generated by subcutaneous inoculation of LLC cells.

The results are shown in FIG. 17. As is clear from FIG. 17, the control group showed little intratumoral penetration of doxorubicin, but in the soybean PC group and the Intralipos group, doxorubicin was delivered to the central region of the tumor.

Example 12: Antitumor Effect of Combination of Phosphatidylcholine and 5-FU

The above studies confirmed that PC administration improves intratumoral blood flow, thereby achieving efficient drug delivery to the deep part of the tumor. In this study, the antitumor effect of a combination of PC and an anticancer drug was examined.

LLC cells ($1 \times 10^6$ cells in 100 μL of PBS per animal) were subcutaneously injected into C57BL/6NCrSlc mice aged 8 weeks (females, SLC, Inc.) to generate cancer-bearing mice. The mice were assigned to 4 groups: a soybean PC group, a 5-FU group, a soybean PC plus 5-FU group, and a control group (vehicle administration group) (3 animals per group). For the soybean PC group and the soybean PC plus 5-FU group, in the same manner as in Example 1, 3 mg/kg (100 μL) of the soybean PC was administered once daily via the mouse tail vein for 13 consecutive days from day 7 to day 20 post-cancer cell inoculation. For the 5-FU group and the soybean PC plus 5-FU group, 5-FU (Kyowa Hakko Kirin Co., Ltd.) was intraperitoneally administered at a dose of 20 mg/kg on day 7 and day 14 post-cancer cell inoculation. Tumor volume was measured on day 7, day 14 and day 21 post-cancer cell inoculation. The tumor volume was calculated by the following formula: length×width×height×0.5.

Figure 18:
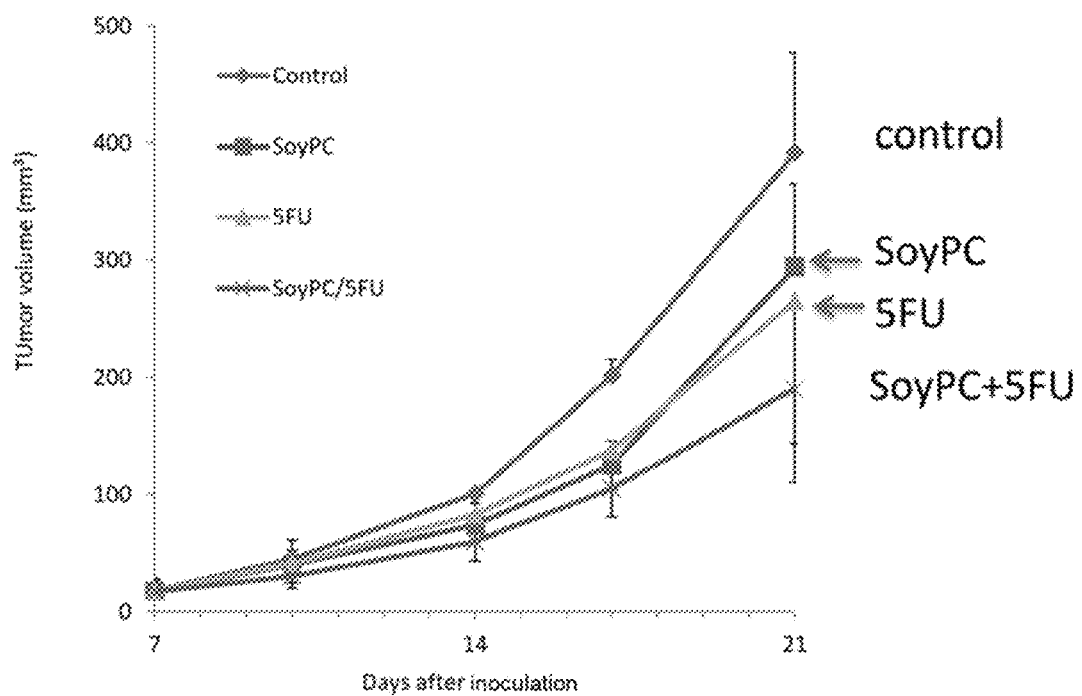
FIG. 18 shows the tumor growth inhibitory effect of combined administration of soybean phosphatidylcholine and 5-FU to tumor-bearing mice generated by subcutaneous inoculation of LLC cells.

The results are shown in FIG. 18. The soybean PC group and the 5-FU group showed tumor growth inhibition as compared with the control group, and the soybean PC plus 5-FU group showed more remarkable tumor growth inhibition than that observed in the groups having received either the soybean PC or 5-FU alone.

The above results show the following: PC enlarges the diameter of intratumoral vessels and promotes vein-like morphological change of intratumoral vessels; PC also induces the connection of intratumoral vessels, resulting in an improved blood flow; and these effects mediate the promotion of drug delivery into tumor tissue, thus remarkably enhancing the effect of the anticancer drug.

Example 13: Effect of Soybean Phosphatidylcholine on HUVEC

The above studies were performed to analyze the effects of PC on blood vessels in cancer-bearing mouse models. In this study, the effect of PC on human vascular endothelial cells were analyzed.
(1) Experimental Method Each well of a 48-well plate was coated with 200 μL of Matrigel (BD biosciences), and human umbilical vein endothelial cells (HUVECs; Kurabo Industries Ltd.) were seeded at $5 \times 10^4$ cells/200 μL/well and cultured. For the culture, HuMedia-EB2 medium (Kurabo Industries, Ltd.) supplemented with 1% FCS was used. VEGF (recombinant human VEGF165, Peprotech) was added at a final concentration of 10 ng/mL to the culture medium to induce tubulogenesis of the vascular endothelial cells. Soybean PC was also added at 10 μM concomitantly with VEGF. At 12 to 16 hours after the start of the culture, the cells were photographed under a microscope. In addition, Hoechst (Boehringer Ingelheim) was added to stain cell nuclei, and newly formed blood vessels were observed. The wells not containing the soybean PC were used as a control.

(2) Results

Figure 19:
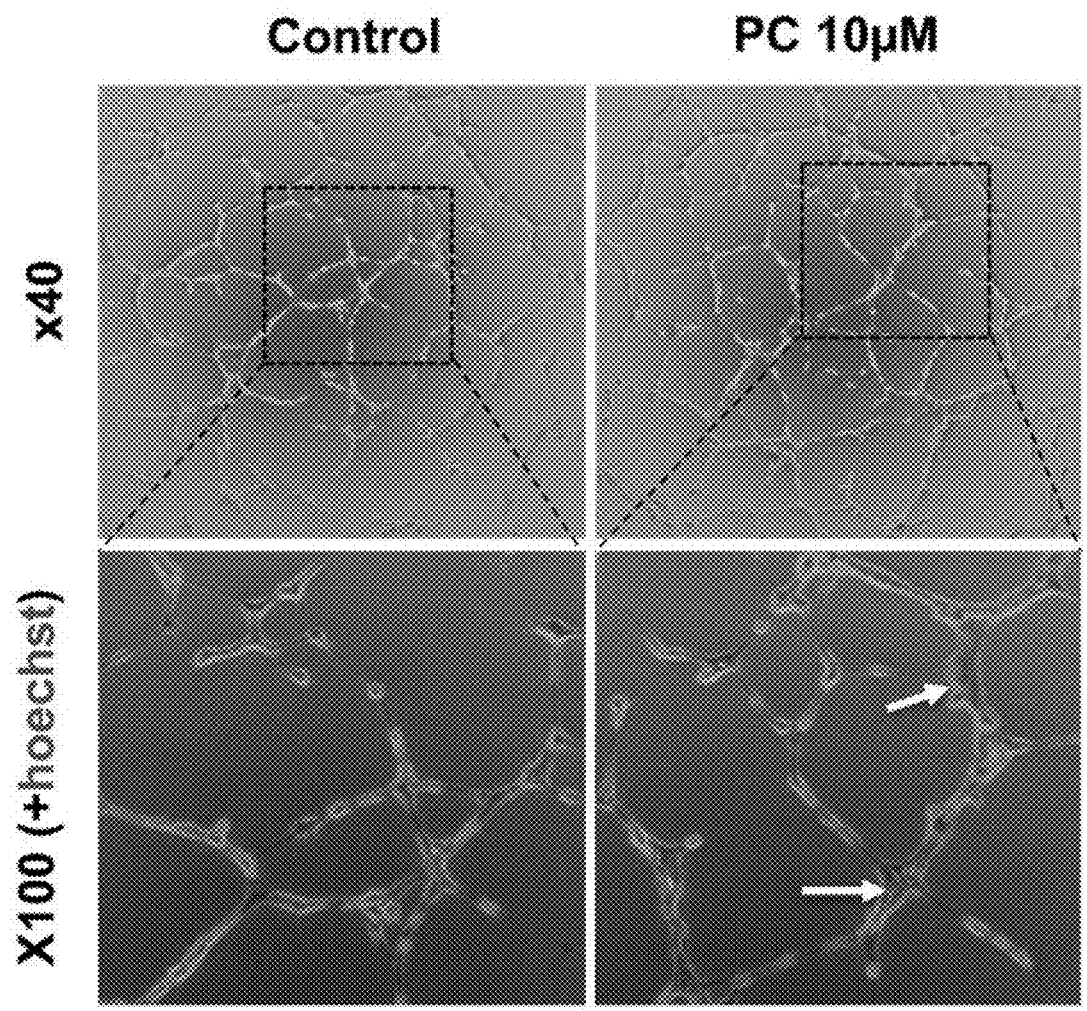
FIG. 19 shows the effect of soybean phosphatidylcholine on tubulogenesis of cultured human umbilical vein endothelial cells (HUVECs).

The results are shown in FIG. 19. The control group and the soybean PC group showed induced tubulogenesis, and in the soybean PC group, some blood vessels had an enlarged diameter (shown by the arrows). The studies of the cancer-bearing mouse models in the above Examples confirmed that PC administration enlarges the diameter of intratumoral vessels and promotes vein-like morphological change of intratumoral vessels. The results of this Example show that PC administration promotes vein-like morphological change of human blood vessels as well.

Example 14: Effect of Various Phosphatidylcholines on HUVEC

The same experiment as in Example 12 was performed using soybean PC and other 8 types of PCs. The PCs were classified as Group A or B as with Example 8. The PCs used were as follows (see Table 2).
Group A:
(1) dioctanoyl phosphatidylcholine (Avanti POLAR LIPIDS)
(2) dimyristoyl phosphatidylcholine (Nippon Fine Chemical)
(3) distearoyl phosphatidylcholine (Nippon Fine Chemical)
(4) dioleoyl phosphatidylcholine (Nippon Fine Chemical)
(5) dilinoleoyl phosphatidylcholine (Avanti POLAR LIPIDS)
(6) didocosahexaenoyl phosphatidylcholine (Avanti POLAR LIPIDS)
Group B:
(7) (1-palmitoyl-2-myristoyl) phosphatidylcholine (Avanti POLAR LIPIDS)
(8) (1-palmitoyl-2-oleoyl) phosphatidylcholine (Avanti POLAR LIPIDS)

Figure 20:
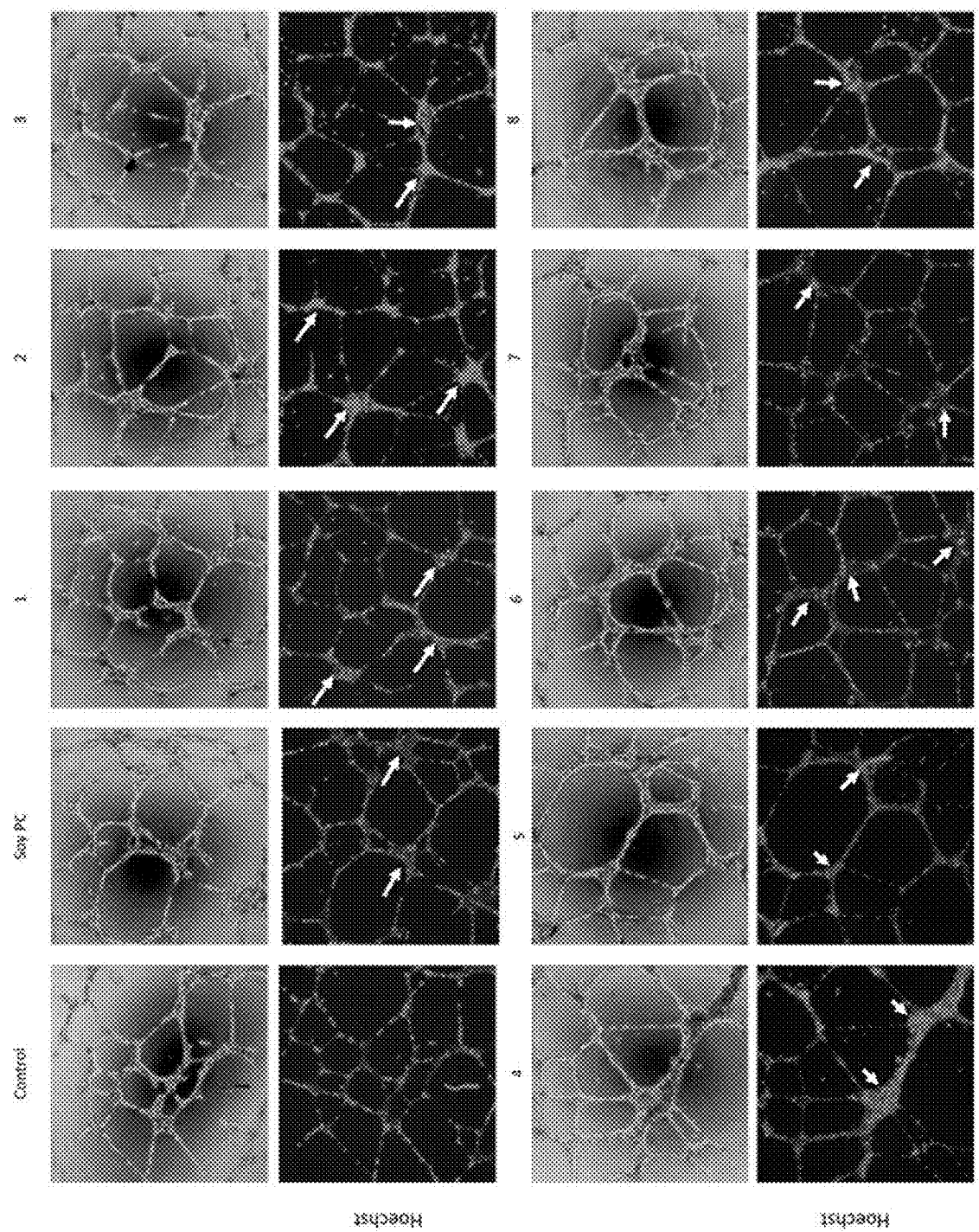
FIG. 20 shows the effect of various phosphatidylcholines on tubulogenesis of cultured human umbilical vein endothelial cells (HUVECs).

The results are shown in Table 2 and FIG. 20. The control group, the soybean PC group and the other PC groups (1 to 8) all showed induced tubulogenesis, and in the soybean PC group and the other PC groups (1 to 8), some blood vessels had an enlarged diameter (shown by the arrows). That is, the results show that not only soybean PC but other PCs indicated above are effective for promoting vein-like morphological change of vessels.

TABLE 2

| Group | Name of phosphatidylcholine | Vein-like morphological change |
|---|---|---|
| A | Dioctanoyl phosphatidylcholine | yes |
|  | Dimyristoyl phosphatidylcholine | yes |
|  | Distearoyl phosphatidylcholine | yes |
|  | Dioleoyl phosphatidylcholine | yes |
|  | Dilinoleoyl phosphatidylcholine | yes |
|  | Didocosahexaenoyl phosphatidylcholine | yes |
| B | (1-Palmitoyl-2-myristoyl) phosphatidylcholine | yes |
|  | (1-Palmitoyl-2-oleoyl) phosphatidylcholine | yes |

The present disclosure is not limited to the embodiments and examples described above, and various modifications can be made within the scope of the appended claims. Other embodiments provided by suitably combining technical means disclosed in separate embodiments of the present disclosure are also within the technical scope of the present disclosure. All the academic publications and patent literature cited in the description are incorporated herein by reference.

The invention claimed is:

1. A method for promoting infiltration of leukocytes into tumor tissue without mediation of a lysophospholipid receptor, comprising starting administration of a phosphatidylcholine to a mammal with a tumor that is a mass of abnormally growing cells without an anti-PD-1 antibody or anti-PD-L1 antibody,
    wherein the administration of the phosphatidylcholine promotes the infiltration of the leukocytes into the tumor tissue without mediation of the lysophospholipid receptor,
    wherein the tumor is colon cancer, and
    wherein the phosphatidylcholine is not a phosphatidylcholine that is a component of another agent to be administered in the form of liposomes or colloidal particles encapsulating or incorporating another therapeutic drug.

2. The method according to claim 1, wherein the leukocytes are CD4-positive cells and/or CD8-positive cells.

3. A method for stimulating antitumor immunity for promoting infiltration of leukocytes into tumor tissue without mediation of a lysophospholipid receptor, comprising starting administration of a phosphatidylcholine to a mammal with a tumor that is a mass of abnormally growing cells without an anti-PD-1 antibody or anti-PD-L1 antibody,
    wherein the administration of the phosphatidylcholine promotes the infiltration of the leukocytes into the tumor tissue without mediation of the lysophospholipid receptor,
    wherein the tumor is colon cancer, and
    wherein the phosphatidylcholine is not a phosphatidylcholine that is a component of another agent to be administered in the form of liposomes or colloidal particles encapsulating or incorporating another therapeutic drug.

4. The method according to claim 3, wherein the leukocytes are CD4-positive cells and/or CD8-positive cells.

* * * * *